US009420266B2

(12) United States Patent
Woodgate et al.

(10) Patent No.: US 9,420,266 B2
(45) Date of Patent: Aug. 16, 2016

(54) STEPPED WAVEGUIDE AUTOSTEREOSCOPIC DISPLAY APPARATUS WITH A REFLECTIVE DIRECTIONAL ELEMENT

(71) Applicant: RealD Inc., Beverly Hills, CA (US)

(72) Inventors: Graham J. Woodgate, Henley-on-Thames (GB); Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 14/044,607

(22) Filed: Oct. 2, 2013

(65) Prior Publication Data

US 2014/0092472 A1    Apr. 3, 2014

Related U.S. Application Data

(60) Provisional application No. 61/709,068, filed on Oct. 2, 2012, provisional application No. 61/745,160, filed on Dec. 21, 2012, provisional application No. 61/709,038, filed on Oct. 2, 2012.

(51) Int. Cl.
*G02B 27/22* (2006.01)
*H04N 13/04* (2006.01)
(Continued)

(52) U.S. Cl.
CPC .......... *H04N 13/0402* (2013.01); *G02B 6/0045* (2013.01); *G02B 6/0048* (2013.01); *G02B 27/02* (2013.01); *G02B 27/22* (2013.01);
(Continued)

(58) Field of Classification Search
CPC ...... G02F 1/011; G02B 27/02; G02B 6/0045; G02B 6/0048; G02B 27/22; G02B 27/225; G02B 27/2264; H04N 13/00; H04M 13/8468; H04M 13/0402

USPC .................................. 348/E13.027; 359/464
See application file for complete search history.

(56) References Cited

U.S. PATENT DOCUMENTS

| 2,133,121 A | 10/1938 | Stearns |
| 2,810,905 A | 10/1957 | Barlow |

(Continued)

FOREIGN PATENT DOCUMENTS

| CN | 1487332 A | 4/2004 |
| CN | 1307481 C | 3/2007 |

(Continued)

OTHER PUBLICATIONS

International search report and written opinion of international searching authority for PCT application PCT/US2013/063133 mailed Jan. 20, 2014.

(Continued)

*Primary Examiner* — Zachary Wilkes
*Assistant Examiner* — George G King
(74) *Attorney, Agent, or Firm* — Neil G. J. Mothew; Penny L. Lowry

(57) ABSTRACT

An autostereoscopic display apparatus may include a stepped waveguide, optical elements, and one or more reflective imaging and/or directional elements. These elements may be arranged to return light from the stepped waveguide into an array of viewing windows. Such elements can be used to achieve observer tracking autostereoscopic display for landscape and portrait modes of operation. System thickness and cost may be reduced and system brightness can be increased or low operating power modes may be achieved.

23 Claims, 26 Drawing Sheets

(51) Int. Cl.

| | | |
|---|---|---|
| *F21V 8/00* | (2006.01) | |
| *G02F 1/01* | (2006.01) | |
| *G02B 27/02* | (2006.01) | |
| *H04N 13/00* | (2006.01) | |

(52) U.S. Cl.
CPC ......... *G02B 27/225* (2013.01); *G02B 27/2264* (2013.01); *G02F 1/011* (2013.01); *H04N 13/00* (2013.01); *H04N 13/0468* (2013.01)

(56) References Cited

U.S. PATENT DOCUMENTS

| | | | |
|---|---|---|---|
| 5,347,644 A | 9/1994 | Sedlmayr | |
| 5,703,667 A | 12/1997 | Ochiai | |
| 5,727,107 A | 3/1998 | Umemoto et al. | |
| 5,771,066 A * | 6/1998 | Barnea | 348/59 |
| 5,896,225 A | 4/1999 | Chikazawa | |
| 5,903,388 A | 5/1999 | Sedlmayr | |
| 5,959,664 A | 9/1999 | Woodgate | |
| 5,971,559 A | 10/1999 | Ishikawa et al. | |
| 6,014,164 A | 1/2000 | Woodgate et al. | |
| 6,075,557 A * | 6/2000 | Holliman et al. | 348/51 |
| 6,108,059 A | 8/2000 | Yang | |
| 6,144,118 A | 11/2000 | Cahill et al. | |
| 6,199,995 B1 | 3/2001 | Umemoto | |
| 6,305,813 B1 | 10/2001 | Lekson et al. | |
| 6,464,365 B1 | 10/2002 | Gunn et al. | |
| 6,663,254 B2 | 12/2003 | Ohsumi | |
| 6,847,488 B2 | 1/2005 | Travis | |
| 6,870,671 B2 | 3/2005 | Travis | |
| 6,883,919 B2 | 4/2005 | Travis | |
| 7,052,168 B2 | 5/2006 | Epstein et al. | |
| 7,058,252 B2 | 6/2006 | Woodgate | |
| 7,073,933 B2 * | 7/2006 | Gotoh et al. | 362/624 |
| 7,101,048 B2 | 9/2006 | Travis | |
| 7,136,031 B2 * | 11/2006 | Lee et al. | 345/32 |
| 7,215,415 B2 | 5/2007 | Maehara | |
| 7,410,286 B2 | 8/2008 | Travis | |
| 7,430,358 B2 | 9/2008 | Qi et al. | |
| 7,528,893 B2 | 5/2009 | Schultz | |
| 7,545,429 B2 | 6/2009 | Travis | |
| 7,660,047 B1 | 2/2010 | Travis | |
| 7,750,981 B2 | 7/2010 | Shestak | |
| 7,750,982 B2 | 7/2010 | Nelson | |
| 7,944,428 B2 | 5/2011 | Travis | |
| 7,970,246 B2 | 6/2011 | Travis et al. | |
| 7,976,208 B2 | 7/2011 | Travis | |
| 8,016,475 B2 | 9/2011 | Travis | |
| 8,216,405 B2 | 7/2012 | Emerton | |
| 8,223,296 B2 | 7/2012 | Lee et al. | |
| 8,325,295 B2 | 12/2012 | Sugita | |
| 8,354,806 B2 | 1/2013 | Travis | |
| 8,477,261 B2 | 7/2013 | Travis | |
| 8,534,901 B2 | 9/2013 | Panagotacos | |
| 8,556,491 B2 | 10/2013 | Lee | |
| 8,651,725 B2 | 2/2014 | Le et al. | |
| 8,714,804 B2 | 5/2014 | Kim et al. | |
| 9,197,884 B2 | 11/2015 | Lee et al. | |
| 2002/0113866 A1 | 8/2002 | Taniguchi et al. | |
| 2003/0137738 A1 | 7/2003 | Ozawa et al. | |
| 2004/0108971 A1 | 6/2004 | Waldern et al. | |
| 2004/0109303 A1 | 6/2004 | Olczak | |
| 2004/0170011 A1 | 9/2004 | Kim et al. | |
| 2004/0263968 A1 | 12/2004 | Kobayashi et al. | |
| 2005/0110980 A1 | 5/2005 | Maehara et al. | |
| 2005/0135116 A1 | 6/2005 | Epstein et al. | |
| 2005/0180167 A1 | 8/2005 | Hoelen et al. | |
| 2005/0190345 A1 | 9/2005 | Dubin et al. | |
| 2005/0264717 A1 | 12/2005 | Chen et al. | |
| 2005/0276071 A1 | 12/2005 | Sasagawa et al. | |
| 2006/0132423 A1 | 6/2006 | Travis | |
| 2006/0139447 A1 | 6/2006 | Unkrich | |
| 2006/0158729 A1 | 7/2006 | Vissenberg et al. | |
| 2006/0215129 A1 | 9/2006 | Alasaarela et al. | |
| 2006/0227427 A1 | 10/2006 | Dolgoff | |
| 2006/0269213 A1 | 11/2006 | Hwang et al. | |
| 2006/0291053 A1 | 12/2006 | Robinson et al. | |
| 2006/0291243 A1 | 12/2006 | Niioka et al. | |
| 2007/0025680 A1 | 2/2007 | Winston et al. | |
| 2007/0115552 A1 | 5/2007 | Robinson et al. | |
| 2007/0188667 A1 | 8/2007 | Schwerdtner | |
| 2007/0223252 A1 * | 9/2007 | Lee et al. | 362/615 |
| 2008/0084519 A1 | 4/2008 | Brigham et al. | |
| 2008/0086289 A1 | 4/2008 | Brott | |
| 2008/0225205 A1 | 9/2008 | Travis | |
| 2008/0259012 A1 | 10/2008 | Fergason | |
| 2008/0297459 A1 | 12/2008 | Sugimoto et al. | |
| 2008/0304282 A1 | 12/2008 | Mi et al. | |
| 2008/0316768 A1 | 12/2008 | Travis | |
| 2009/0016057 A1 | 1/2009 | Rinko | |
| 2009/0067156 A1 | 3/2009 | Bonnett et al. | |
| 2009/0140656 A1 | 6/2009 | Kohashikawa et al. | |
| 2009/0160757 A1 | 6/2009 | Robinson | |
| 2009/0174700 A1 | 7/2009 | Daiku | |
| 2009/0190079 A1 | 7/2009 | Saitoh | |
| 2009/0225380 A1 | 9/2009 | Schwerdtner et al. | |
| 2009/0278936 A1 | 11/2009 | Pastoor et al. | |
| 2010/0053771 A1 | 3/2010 | Travis | |
| 2010/0091254 A1 | 4/2010 | Travis | |
| 2010/0165598 A1 | 7/2010 | Chen et al. | |
| 2010/0177387 A1 | 7/2010 | Travis | |
| 2010/0188438 A1 | 7/2010 | Kang | |
| 2010/0188602 A1 | 7/2010 | Feng | |
| 2010/0214135 A1 | 8/2010 | Bathiche | |
| 2010/0220260 A1 | 9/2010 | Sugita et al. | |
| 2010/0231498 A1 | 9/2010 | Large | |
| 2010/0277575 A1 | 11/2010 | Ismael et al. | |
| 2010/0278480 A1 * | 11/2010 | Vasylyev | 385/33 |
| 2010/0295930 A1 | 11/2010 | Ezhov | |
| 2010/0300608 A1 | 12/2010 | Emerton et al. | |
| 2011/0032483 A1 | 2/2011 | Hiruska et al. | |
| 2011/0043142 A1 | 2/2011 | Travis et al. | |
| 2011/0044056 A1 | 2/2011 | Travis | |
| 2011/0044579 A1 | 2/2011 | Travis et al. | |
| 2011/0051237 A1 | 3/2011 | Hasegawa et al. | |
| 2011/0187293 A1 | 8/2011 | Travis | |
| 2011/0188120 A1 | 8/2011 | Tabirian et al. | |
| 2011/0216266 A1 | 9/2011 | Travis | |
| 2011/0242150 A1 | 10/2011 | Song et al. | |
| 2011/0242298 A1 | 10/2011 | Bathiche et al. | |
| 2011/0255303 A1 | 10/2011 | Nichol et al. | |
| 2011/0285927 A1 | 11/2011 | Schultz et al. | |
| 2011/0310232 A1 | 12/2011 | Wilson et al. | |
| 2012/0002136 A1 | 1/2012 | Nagata et al. | |
| 2012/0002295 A1 | 1/2012 | Dobschal et al. | |
| 2012/0013720 A1 | 1/2012 | Kadowaki et al. | |
| 2012/0127573 A1 | 5/2012 | Robinson et al. | |
| 2012/0243204 A1 | 9/2012 | Robinson | |
| 2013/0101253 A1 | 4/2013 | Popovich et al. | |
| 2013/0135588 A1 | 5/2013 | Popovich et al. | |
| 2014/0340728 A1 | 11/2014 | Taheri | |

FOREIGN PATENT DOCUMENTS

| | | |
|---|---|---|
| CN | 101029975 A | 9/2007 |
| CN | 101049028 A | 10/2007 |
| CN | 100449353 | 1/2009 |
| CN | 100591141 | 2/2010 |
| EP | 0721131 A2 | 7/1996 |
| EP | 0939273 A1 | 1/1999 |
| EP | 0860729 A1 | 7/2006 |
| EP | 2003394 A1 | 12/2008 |
| JP | 08-237691 A | 9/1996 |
| JP | 08254617 B2 | 10/1996 |
| JP | 08340556 B2 | 12/1996 |
| JP | 2000-200049 A | 7/2000 |
| JP | 2002-049004 A | 2/2002 |
| JP | 2003-215705 A | 7/2003 |
| JP | 2004-319364 A | 11/2004 |
| JP | 2005-135844 A | 5/2005 |
| JP | 2005-183030 A | 7/2005 |
| JP | 2005-259361 A | 9/2005 |
| JP | 2006-004877 A | 1/2006 |
| JP | 2006-031941 A | 2/2006 |

(56) References Cited

FOREIGN PATENT DOCUMENTS

| | | |
|---|---|---|
| JP | 2008-204874 A | 9/2008 |
| KR | 10-2003-0064258 A | 7/2003 |
| KR | 10-0932304 B1 | 12/2009 |
| KR | 102011-0006773 A | 1/2011 |
| KR | 102011-0017918 A | 2/2011 |
| KR | 102011-0067534 A | 6/2011 |
| KR | 10-2012-004989 A | 5/2012 |
| KR | 102012-0048301 A | 5/2012 |
| KR | 20120048301 A | 5/2012 |
| WO | 2001-61241 A1 | 8/2001 |

OTHER PUBLICATIONS

International search report and written opinion of international searching authority for PCT application PCT/US2013/063125 mailed Jan. 20, 2014.
International search report and written opinion of international searching authority for PCT application PCT/US2013/077288 mailed Apr. 18, 2014.
International search report and written opinion of international searching authority for PCT application PCT/US2014/017779 mailed May 28, 2014.
International search report and written opinion of international searching authority for PCT application No. PCT/US2013/041697 mailed Aug. 23, 2013.
International search report and written opinion of international searching authority for PCT application No. PCT/US2013/041235 mailed Aug. 23, 2013.
International search report and written opinion of international searching authority for PCT application No. PCT/US2013/041228 mailed Aug. 23, 2013.
International search report and written opinion of international searching authority for PCT application No. PCT/US2013/041683 mailed Aug. 27, 2013.
International search report and written opinion of international searching authority for PCT application No. PCT/US2013/041548 mailed Aug. 27, 2013.
International search report and written opinion of international searching authority for PCT application No. PCT/US2013/041703 mailed Aug. 27, 2013.
International search report and written opinion of international searching authority for PCT application No. PCT/US2013/041655 mailed Aug. 27, 2013.
International search report and written opinion of international searching authority for PCT application No. PCT/US2013/041619 mailed Aug. 27, 2013.
International search report and written opinion of international searching authority for PCT application No. PCT/US2013/041192 mailed Aug. 28, 2013.
Kalantar, et al., "Backlight Unit With Double Surface Light Emission", J. Soc. Inf. Display, 12:4, pp. 279-287 (Dec. 2004).
Tabiryan et al., "The Promise of Diffractive Waveplates", Optics and Photonics News, 21:3, pp. 40-45 (Mar. 2010).
Office Action for Chinese Patent Application No. 201380026059.1 dated Apr. 25, 2016.
Office Action for Chinese Patent Application No. 201380049451.8 dated Apr. 5, 2016.
13844510.1 European Extended Search Report of European Patent Office dated May 13, 2016.

* cited by examiner

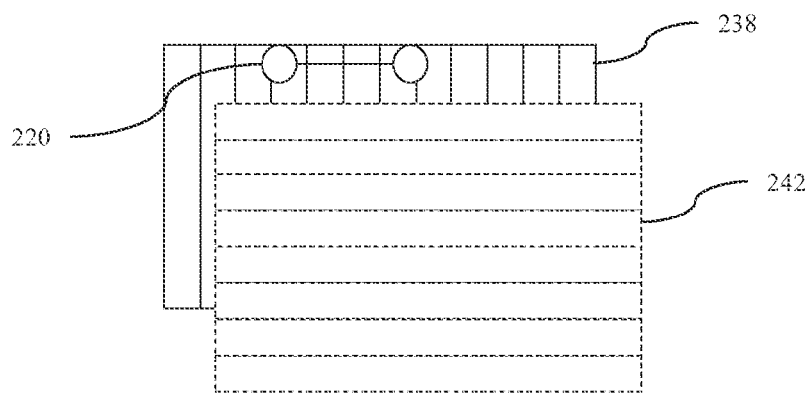
FIG. 14A
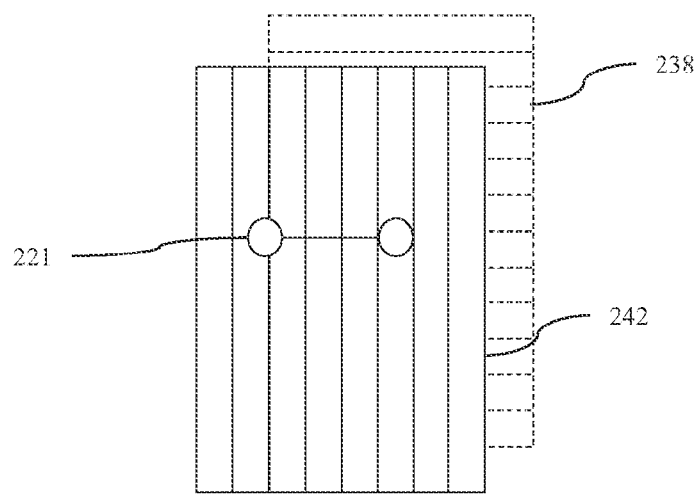
FIG. 14B
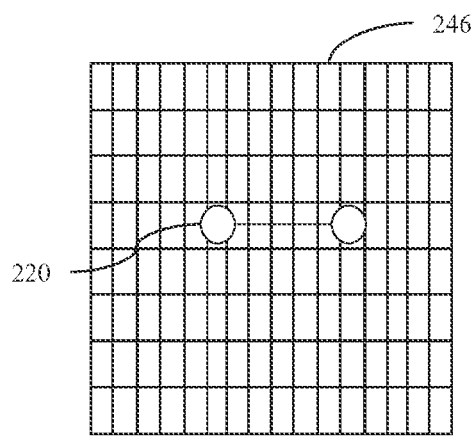 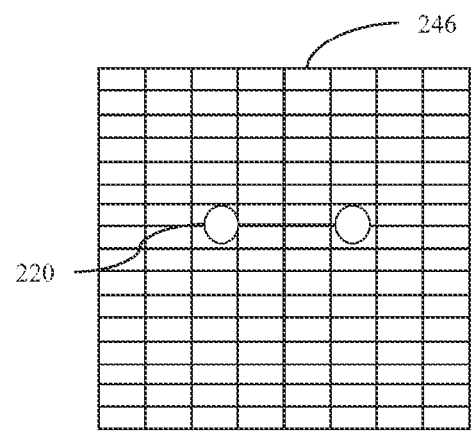
FIG. 15A                    FIG. 15B

STEPPED WAVEGUIDE AUTOSTEREOSCOPIC DISPLAY APPARATUS WITH A REFLECTIVE DIRECTIONAL ELEMENT

CROSS-REFERENCE TO RELATED APPLICATIONS

This application claims priority under 35 USC 119(e) to: (a) U.S. Provisional Patent Application No. 61/709,068, entitled "Stepped waveguide autostereoscopic display apparatus comprising a reflective directional element," filed Oct. 2, 2012; (b) U.S. Provisional Patent Application No. 61/745,160, entitled "Temporally multiplexed display with landscape and portrait operation modes." filed Dec. 21, 2012; and (c) U.S. Provisional Patent Application No. 61/709,038, entitled "Temporally multiplexed display with landscape and portrait operation modes", filed Oct. 2, 2012, the entireties of which are herein incorporated by reference.

Co-pending and commonly-owned U.S. patent application Ser. No. 13/939,053, entitled "Observer tracking autostereoscopic display", filed Jul. 10, 2013 describes a spatially multiplexed observer tracking autostereoscopic display for landscape and portrait operation comprising viewing windows aligned at substantially a 45 degree angle to the major axes of a spatial light modulator, and is herein incorporated by reference for all purposes.

TECHNICAL FIELD

This disclosure generally relates to autostereoscopic display apparatuses comprising step waveguide optical elements and reflective directional elements. Such elements can be used to achieve observer tracking autostereoscopic display for landscape and portrait modes of operation.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293, which is herein incorporated by reference, in its entirety.

According to the present invention, there is provided a light directing device comprising: a waveguide extending between an input end for receiving input light and a reflective end for reflecting the input light back through the waveguide, the waveguide having first and second, opposed guide surfaces for guiding light forwards and back along the waveguide, wherein the second guide surface has a plurality of light extraction features facing the reflective end and inclined to reflect the light guided back through the waveguide from the reflective end in directions allowing exit through the first guide surface, the light extraction features being arranged to direct input light from different input positions across the input end in directions that are dependent on the input position; and a reflective element arranged to reflect the light exiting the first guide surface back through the guide surface to exit through the second guide surface.

The provision of the reflective element reverses the light exiting the first guide surface back through the guide surface, so that it ultimately exits through the second guide surface. Thus, the waveguide may be used in a display device in an orientation that is reversed from that shown in U.S. patent application Ser. No. 13/300,293 so that the second guide surface faces forwards, rather than backwards. This reversed configuration provides significant advantages.

Viewing windows may be improved for reduced image flicker for a moving observer and increased viewing freedom, and thickness and cost may be reduced.

Particular advantage may be achieved when the present invention is applied to a display apparatus in which the spatial light modulator comprises an array of pixels arranged in an aperture with a shape having two perpendicular axes of mirror symmetry. In that case, the viewing windows may extend at an angle in a range from 25 to 65 degrees relative to one of the axes of the shape of the aperture, the sensor system may be further arranged to detect the orientation of the view of the observer, and the control system may be arranged to direct the displayed images into the viewing windows in positions corresponding to the left and right eyes of the observer, in dependence on the detected orientation of the view, as well as the detected position of the observer.

This arrangement benefits from selection of the angle at which the viewing windows extend relative the axes of the shape of the aperture in which the pixels are arranged. A display device is most normally viewed with one of the axes of symmetry close to horizontal, that is in a landscape or portrait orientation in the case of rectangular aperture. Where the viewing windows extend along or close to an axis of symmetry, autostereoscopic display of images can only be provided when the display device is viewed with that axis of symmetry vertical, and not when the display device is rotated by 90 degrees so that the other axis of symmetry is vertical because then a single viewing window extends across both eyes of the viewer.

In contrast, in this arrangement the windows extend at an angle in a range around 45 degrees, for example from 25 to 65 degrees, more preferably 30 to 60 degrees, 35 to 55 degrees, or 40 to 50 degrees. Such angled viewing windows may be used to provide autostereoscopic display of images in varied orientations of the display device, when controlled in dependence on a detected position of the observer and on a detected orientation of the view. In particular, since the angled windows are separated along both axes, left and right images can be directed to be displayed images in viewing windows in positions corresponding to the left and right eyes of the observer, when the display apparatus is viewed in orientations in which either axis is at or around vertical.

Multiple observers may be presented with separate viewing windows.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 14A is a schematic diagram illustrating a front view of an array of viewing windows from an autostereoscopic display apparatus comprising two sets of independently switchable windows for landscape operation, in accordance with the present disclosure;

FIG. 14B is a schematic diagram illustrating a front view of an array of viewing windows from an autostereoscopic display apparatus comprising two sets of independently switchable windows for portrait operation, in accordance with the present disclosure;

FIG. 15A is a schematic diagram illustrating a front view of an array of viewing windows from an autostereoscopic display apparatus comprising a two dimensional window array for landscape operation, in accordance with the present disclosure;

FIG. 15B is a schematic diagram illustrating a front view of an array of viewing windows from an autostereoscopic display apparatus comprising a two dimensional window array for portrait operation, in accordance with the present disclosure;

DETAILED DESCRIPTION

Figure 1A:
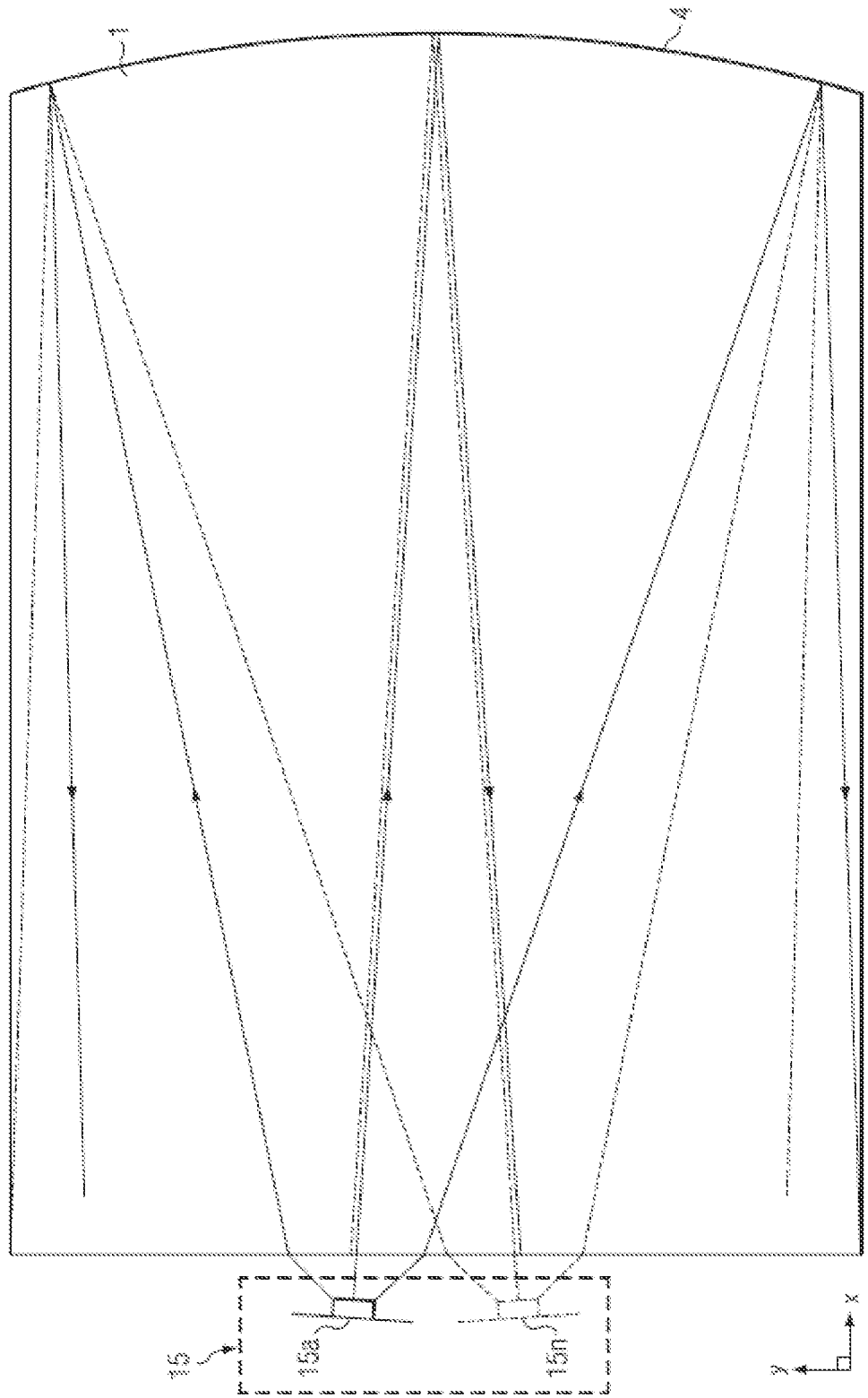
FIG. 1A is a schematic diagram illustrating a front view of light propagation in one embodiment of an optical valve apparatus, in accordance with the present disclosure.

Various display apparatuses and components thereof will now be described. In these alternative apparatuses in general have the same construction and operate in the same manner. Accordingly, the various features of the apparatuses and components may be combined together. For brevity, in the following description, the same reference numerals are used for common elements and a description thereof is not repeated.

Time multiplexed autostereoscopic displays can advantageously improve the spatial resolution of autostereoscopic display by displaying temporally multiplexed left and right images and synchronously directing the displayed images into viewing windows in positions corresponding to the left and right eyes of the observer. That is light is directed from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, employing additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example a 16 mm wide illuminator imaged to a 65 mm wide viewing window may utilize a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

As used herein, an optical valve is an optical structure that may be a type of waveguide or device referred to as, for example, a light valve, an optical valve directional backlight, and a valve directional backlight ("v-DBL"). As used herein for discussion purposes only, and not of limitation, examples of an imaging directional backlight include a stepped imaging directional backlight, a folded imaging directional backlight, a wedge type directional backlight, an optical valve, or an optical inline directional backlight. Additionally, as used herein for discussion purposes only and not of limitation, a stepped imaging directional backlight may be at least one of an optical valve or an optical inline directional backlight. Moreover, as used herein for discussion purposes only and not of limitation, a folded imaging directional backlight may be at least one of a wedge type directional backlight, or an optical valve.

In operation, light may propagate within an exemplary optical valve in a first direction from an input end for receiving input light to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction. The light extraction features are arranged to direct input light from different input positions across the input end in directions that are dependent on that input position.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," and by RealD, for example U.S. Patent Application No. US20120127573, concurrently filed herewith, which may be referred to herein as an "optical inline directional backlight," all of which are herein incorporated by reference in their entirety. Edge lit waveguide backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

The present disclosure provides stepped imaging directional backlights in which light may reflect back and forth between the internal faces of, for example, a stepped waveguide which may include first and second, opposed guide surfaces for guiding light forwards and back along the waveguide, the second guide surface having a plurality of light extraction features. As the light travels along the length of the stepped waveguide, the light may not substantially change angle of incidence with respect to the guide surfaces and so may not reach the critical angle of the medium at these internal faces. Light extraction may be advantageously achieved by the light extraction features that may be surfaces (the step "risers") that are inclined to the second guide surface (the step "treads"). Note that the light extraction features may not be part of the light guiding operation of the stepped waveguide, but may be arranged to provide light extraction from the structure. By contrast, a wedge type directional backlight may allow light to guide within a wedge profiled waveguide having continuous internal surfaces. The optical valve is thus not a wedge type directional backlight.

Figure 1B:
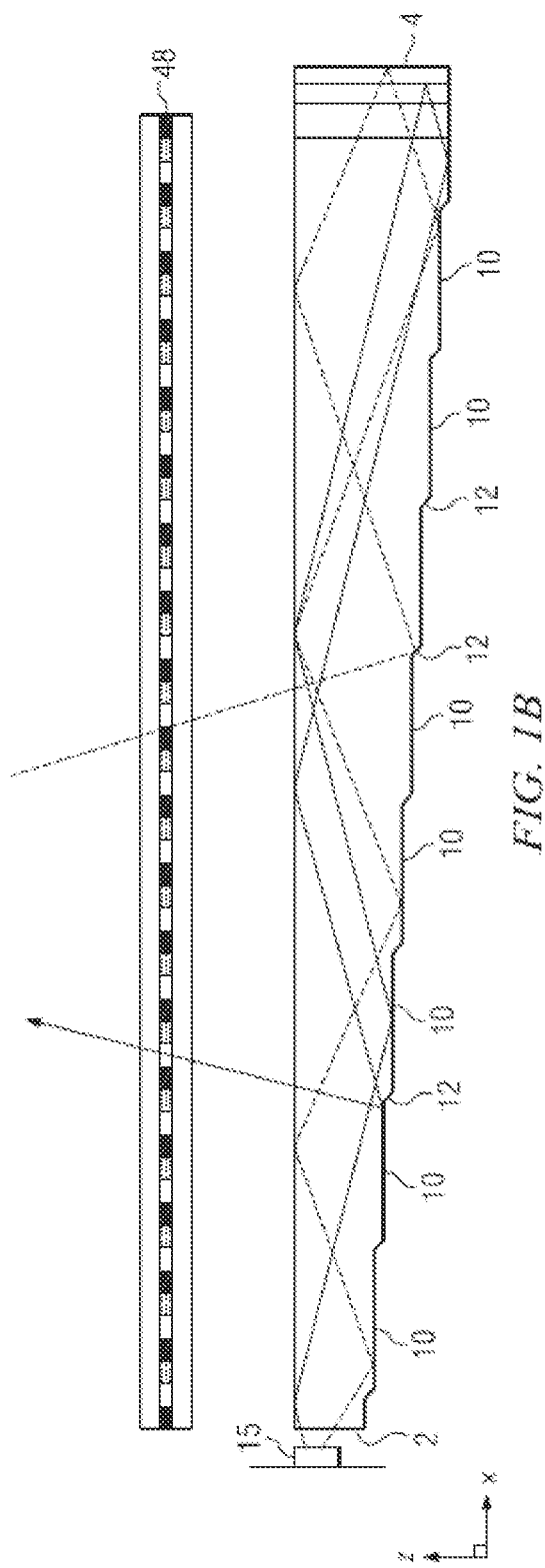
FIG. 1B is a schematic diagram illustrating a side view of light propagation in one embodiment of the optical valve apparatus of FIG. 1A, in accordance with the present disclosure.

FIG. 1A is a schematic diagram illustrating a front view of light propagation in one embodiment of an optical valve structure, and FIG. 1B is a schematic diagram illustrating a side view of light propagation in the optical valve structure of FIG. 1A.

FIG. 1A illustrates a front view in the xy plane of an optical valve, and includes an illuminator array 15 which may be used to illuminate a stepped waveguide 1. Illuminator array 15 includes illuminator elements 15a through illuminator element 15n (where n is an integer greater than or equal to two) that operate as light sources. In one example, the stepped waveguide 1 of FIG. 1A may be a stepped, display sized waveguide 1. Illuminator elements 15a through 15n may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth.

Additionally, FIG. 1B illustrates a side view of the waveguide 1 and a spatial light modulator (SLM) 48 in the xz plane. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is the thin end and a reflective end 4 that is the thick end. The illuminator elements 15a-15n are arranged in an array of light sources at different positions across the thin end 2 of the waveguide 1.

The waveguide 1 has first and second, opposed guide surfaces for guiding light forwards and back along the waveguide. The first guide surface (uppermost in FIG. 1) is substantially planar. The second guide surface is formed by alternately arranged guiding surfaces 10 and extraction surfaces 12. The guiding surfaces 10 are the regions of the second guide surface between the extraction features 12 and are substantially planar.

The extraction features 12 are surfaces facing the reflective end 4 and inclined to reflect the light guided back through the waveguide 1 from the reflective end 4 in directions allowing exit through the first guide surface, for example, upwards in FIG. 1B.

The SLM 48 operates as a transmissive spatial light modulator and extends across the first guide surface of the waveguide 1 for modulating the light exiting therethrough. Although the SLM 48 may be a liquid crystal display (LCD) but this is merely by way of example, and other spatial light modulators or displays may be used including LCOS, DLP devices, and so forth, as this illuminator may work in reflection.

The extraction features 12 are arranged to direct input light from the different input positions across the input end 2 corresponding to each of the illuminator elements 15a-15n in directions that are dependent on those input positions. Under the control of a control system, the illuminator elements 15a-15n may be selectively operated to direct light into a selectable one of the optical windows that may be used individually or in groups as viewing windows.

Consequently, the operation of the optical valve that may direct light into one of a plurality of optical windows having different positions, providing a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of input end 2, x=0, of the stepped waveguide 1. The light may propagate along +x in a first direction, within the stepped waveguide 1, while at the same time, the light may fan out in the xy plane and upon reaching the far, curved reflective end 4, may substantially or entirely fill the curved reflective end 4. While propagating, the light may spread out to a set of angles in the xz plane up to, but not exceeding the critical angle of the guide material. The extraction features 12 that link the guiding surfaces 10 of the second guide surface of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved reflective end 4 of the stepped waveguide 1 may be made reflective, typically by being coated with a reflective material such as, for example, silver, although other reflective techniques may be employed. Light may therefore be redirected in a second direction, back down the waveguide 1 in the direction of −x and may be substantially collimated in the xy or display plane. The angular spread may be substantially preserved in the xz plane about the principal propagation direction, which may allow light to hit the riser edges and reflect out of the guide. In an embodiment with approximately 45° tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xy angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input end center. Having independent illuminator elements 15a-15n along the input end 2 then enables light to exit from the entire first guide surface 6 and propagate at different external angles, as illustrated in FIG. 1A.

Figure 2A:
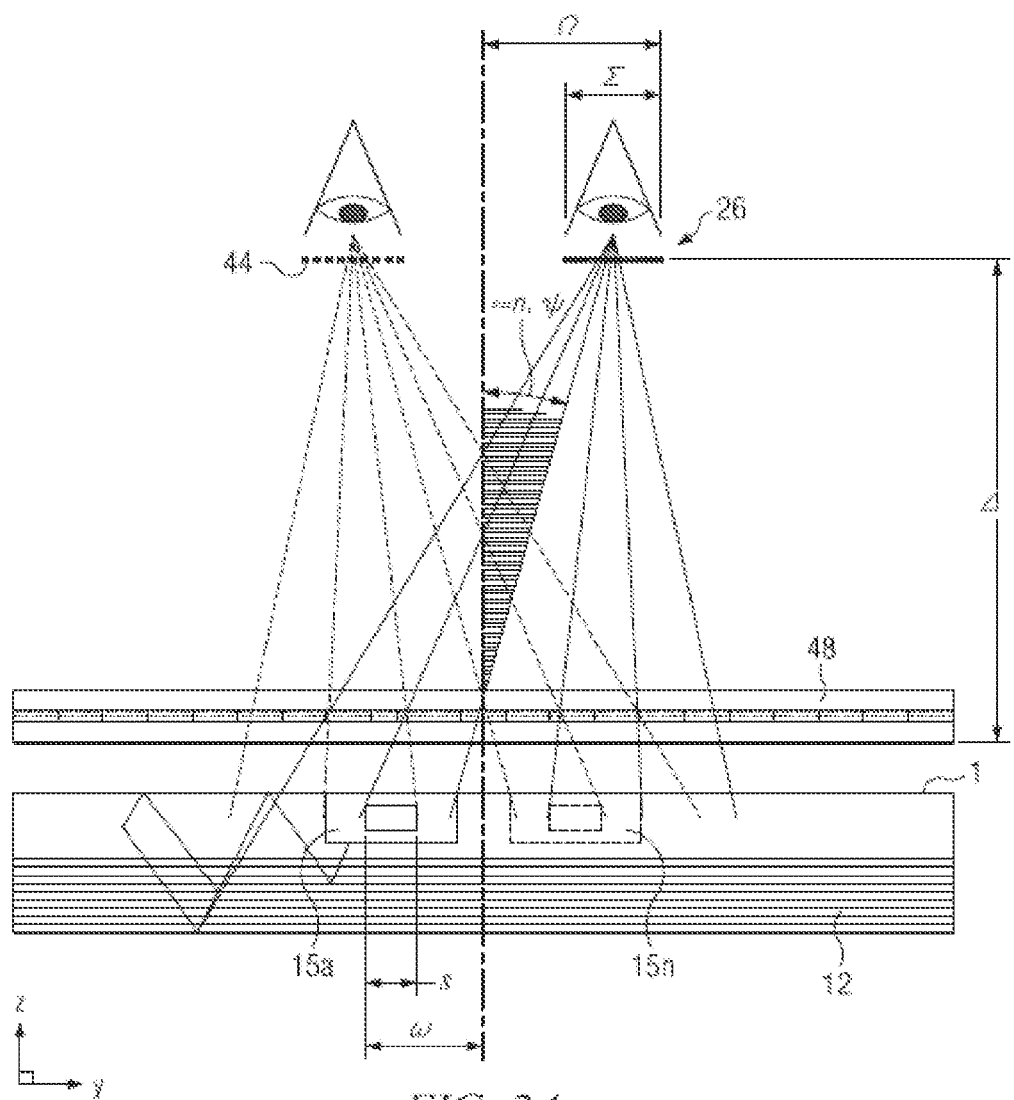
FIG. 2A is a schematic diagram illustrating in a top view of light propagation in another embodiment of an optical valve apparatus, in accordance with the present disclosure.
Figure 2B:
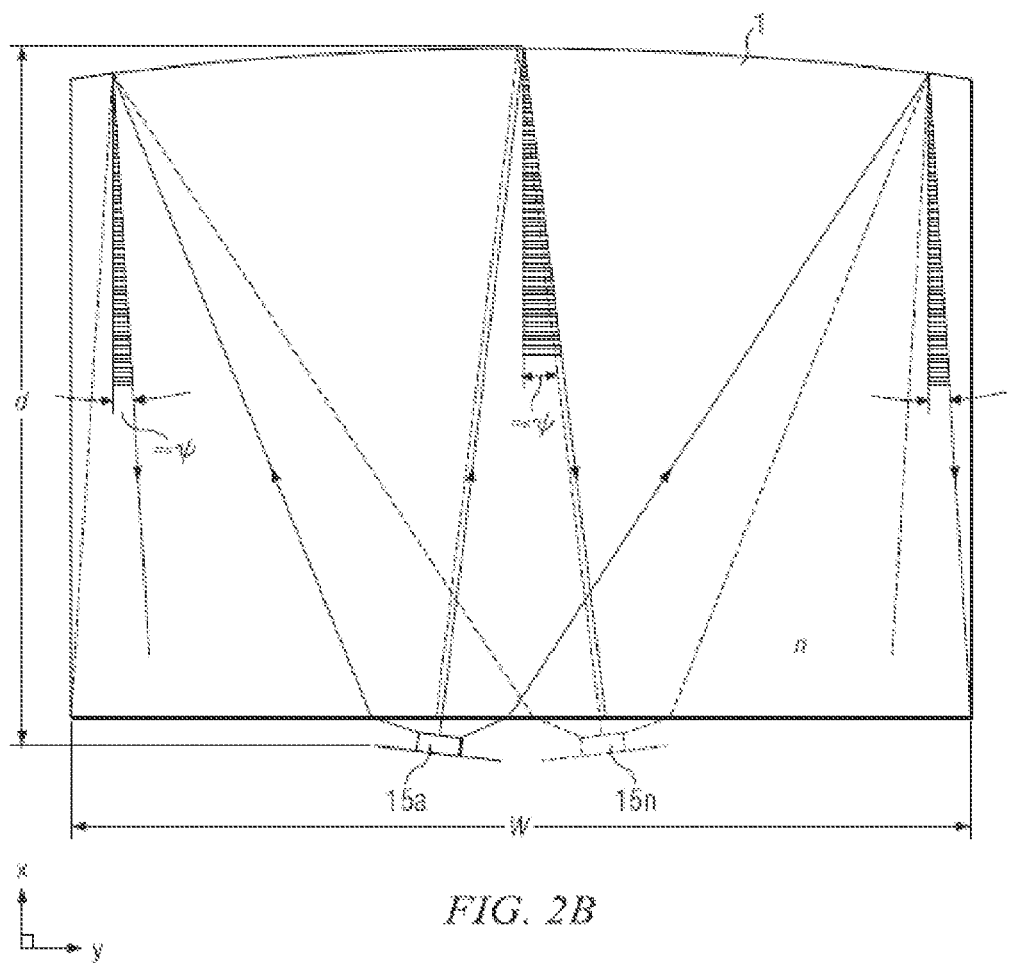
FIG. 2B is a schematic diagram illustrating light propagation in a front view of the optical valve apparatus of FIG. 2A, in accordance with the present disclosure.
Figure 2C:
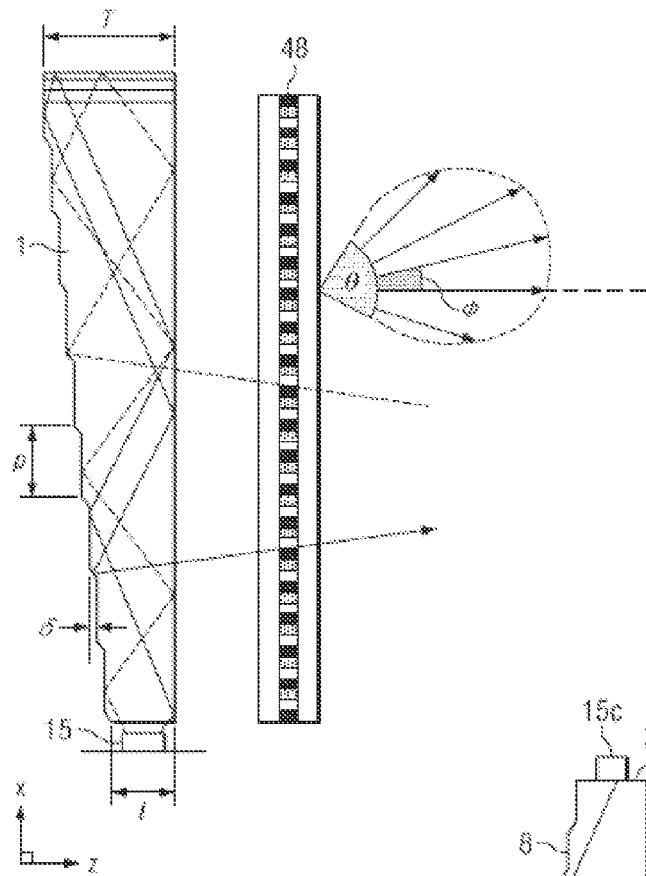
FIG. 2C is a schematic diagram illustrating light propagation in a side view of the optical valve apparatus of FIG. 2A, in accordance with the present disclosure.

Illuminating an SLM 48 such as a fast LCD panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in an optical valve system, FIG. 2B is a schematic diagram illustrating in a front view, propagation of light in an optical valve system, and FIG. 2C is a schematic diagram illustrating in side view propagation of light in an optical valve system. As follows, under the control of a control system, the SLM 48 is caused to display temporally multiplexed left and right eye images and the illuminator element 15a-15n are synchronously operated to direct light into viewing windows, that include one or more optical windows, in positions corresponding to the left and right eyes of an observer. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

Figure 3:
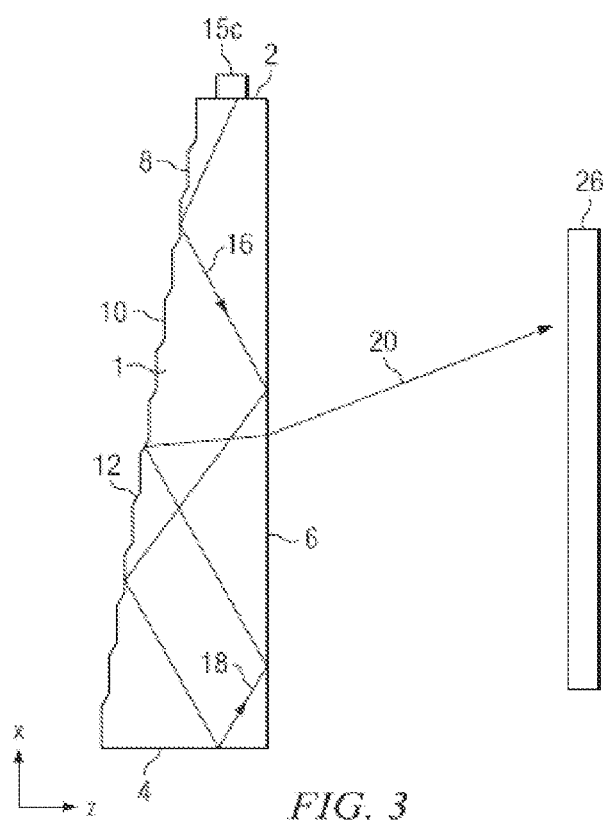
FIG. 3 is a schematic diagram illustrating in a side view of an optical valve apparatus, in accordance with the present disclosure.

FIG. 3 is a schematic diagram illustrating in side view an optical valve. Further, FIG. 3 illustrates additional detail of a side view of the operation of a stepped waveguide 1, which may be a transparent material. The stepped waveguide 1 may include an illuminator input end 2, a reflective end 4, a first light directing side 6 which may be substantially planar, and a second light directing side 8 which includes guiding surfaces 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the end 4 and extraction features 12. The height of the viewing window may be primarily determined by the reflection cone angle of the extraction features 12 and the illumination cone angle input at the input end 2.

Figure 4A:
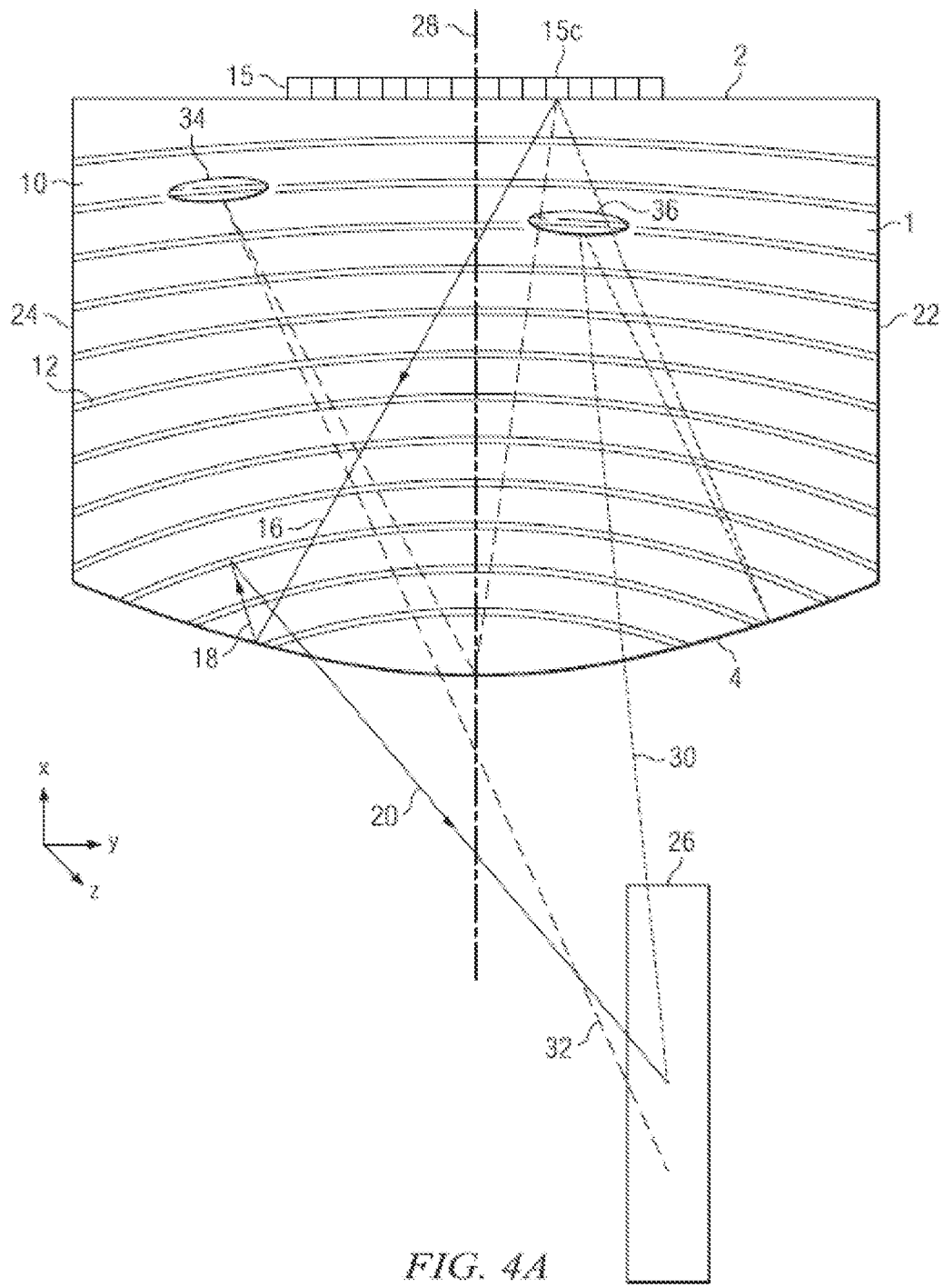
FIG. 4A is schematic diagram illustrating in a front view, generation of a viewing window in an optical valve apparatus and including curved light extraction features, in accordance with the present disclosure.

FIG. 4A is a schematic diagram illustrating in front view an optical valve which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the optical valve may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
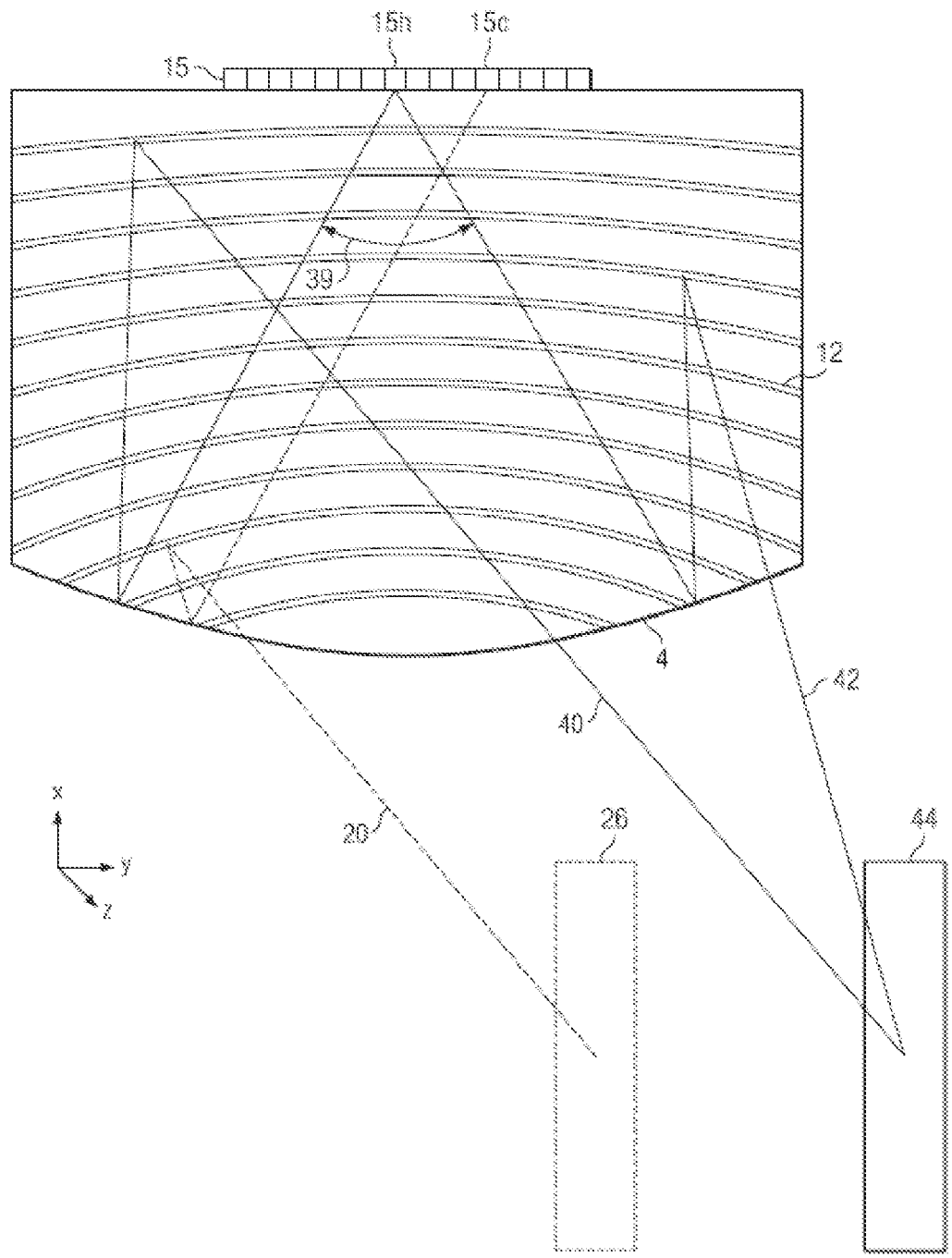
FIG. 4B is a schematic diagram illustrating in a front view, generation of a first and a second viewing window in an optical valve apparatus and including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective surface on the end 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
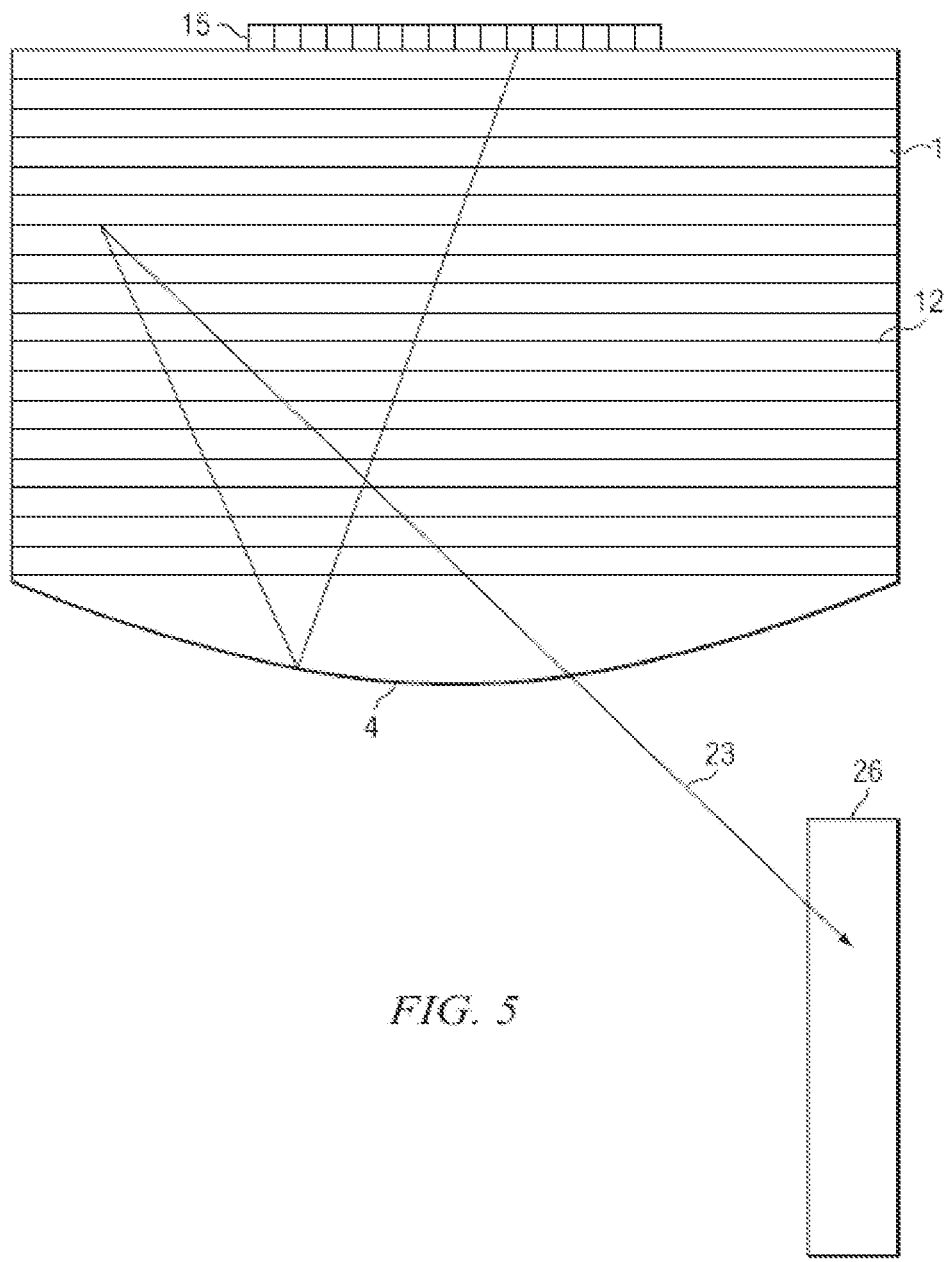
FIG. 5 is a schematic diagram illustrating generation of a first viewing window in an optical valve apparatus including linear light extraction features, in accordance with the present disclosure.

FIG. 5 is a schematic diagram illustrating in front view an embodiment of an optical valve having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
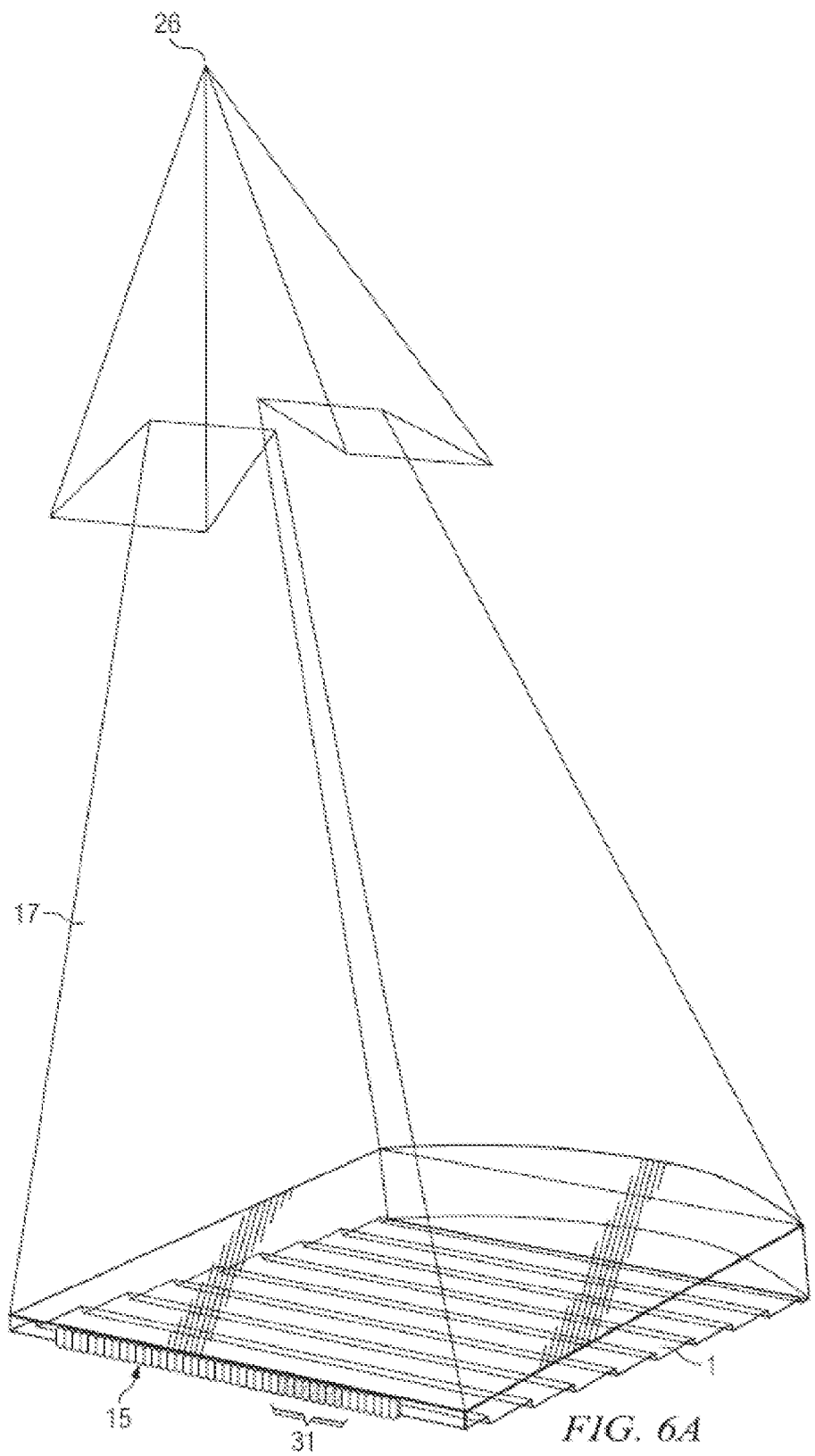
FIG. 6A is a schematic diagram illustrating one embodiment of the generation of a first viewing window in a time multiplexed imaging directional backlight apparatus, in accordance with the present disclosure.
Figure 6B:
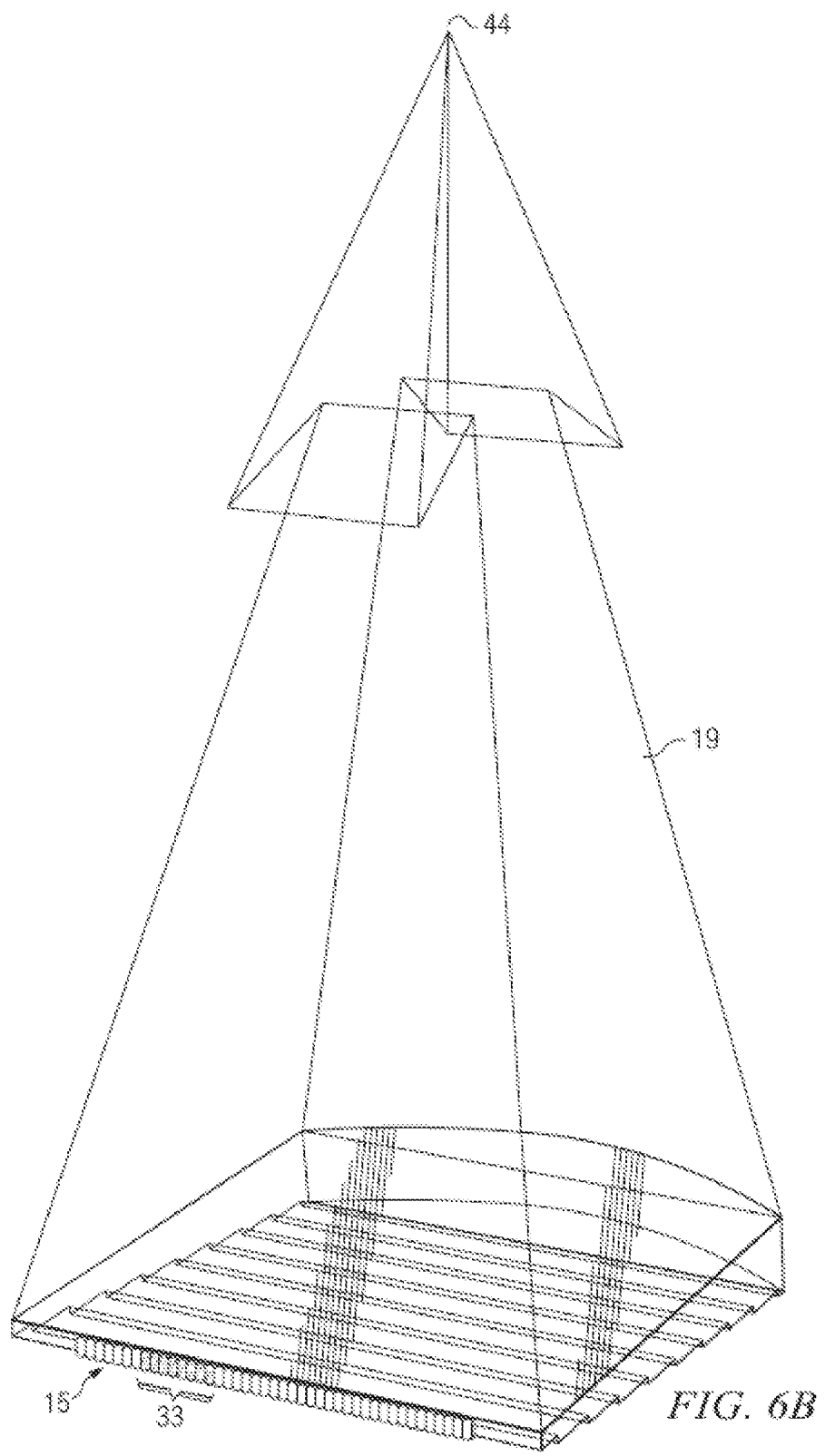
FIG. 6B is a schematic diagram illustrating another embodiment of the generation of a second viewing window in a time multiplexed optical valve apparatus in a second time slot, in accordance with the present disclosure.
Figure 6C:
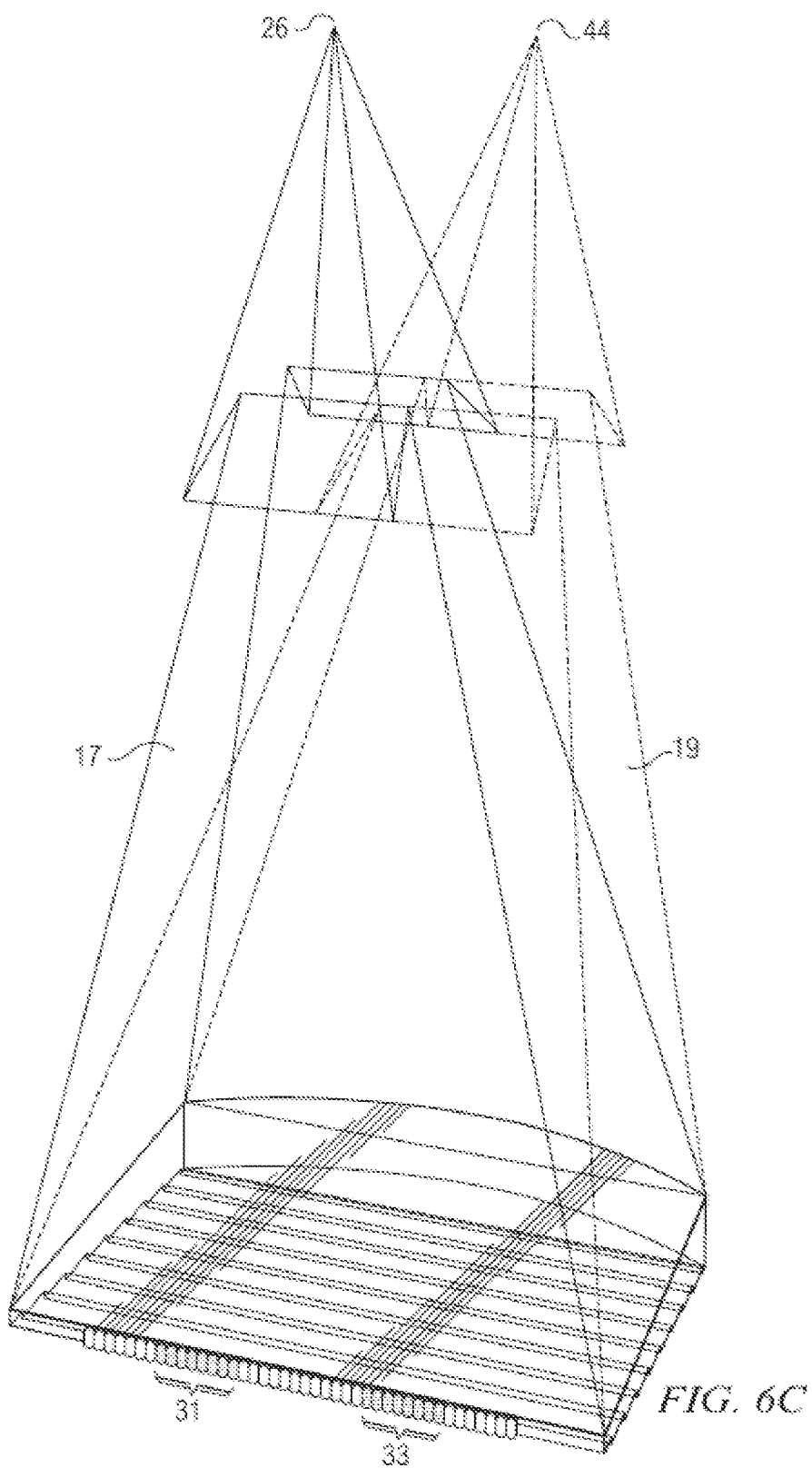
FIG. 6C is a schematic diagram illustrating another embodiment of the generation of a first and a second viewing window in a time multiplexed optical valve apparatus, in accordance with the present disclosure.

FIG. 6A is a schematic diagram illustrating one embodiment of the generation of a first viewing window in a time multiplexed imaging directional backlight apparatus, namely an optical valve apparatus in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional backlight apparatus. Further, FIG. 6A shows schematically the generation of illumination window 26 from stepped waveguide 1.

Illuminator element 15c in illuminator array 15 may provide a light cone 17 directed towards a viewing window 26. FIG. 6B shows schematically the generation of illumination window 44. Illuminator element 15h in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all imaging optical valve systems or imaging directional backlights.

Figure 7:
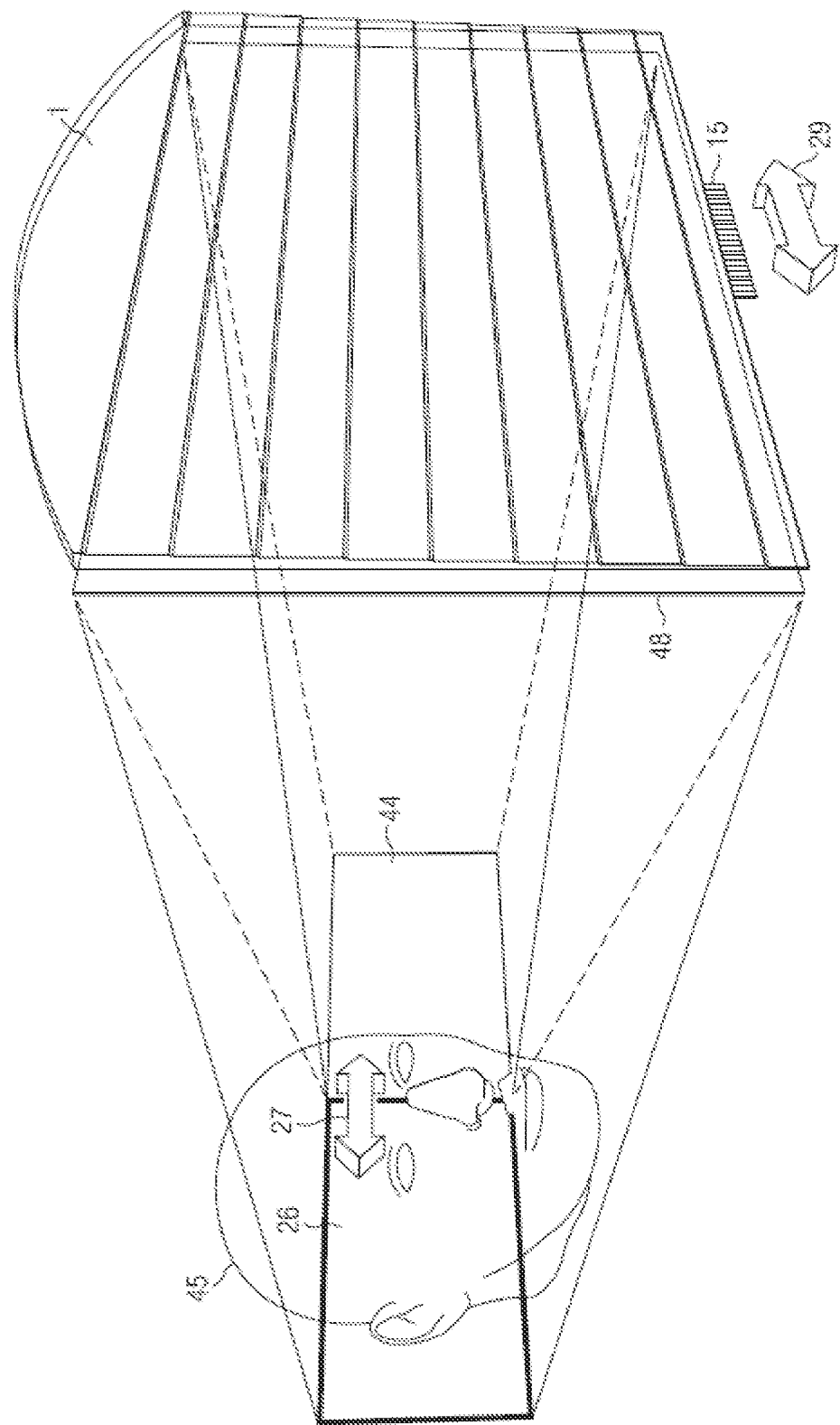
FIG. 7 is a schematic diagram illustrating an observer tracking autostereoscopic display apparatus including a time multiplexed optical valve apparatus, in accordance with the present disclosure.

FIG. 7 is a schematic diagram illustrating one embodiment of an observer tracking autostereoscopic display apparatus including a time multiplexed optical valve apparatus. As shown in FIG. 7, selectively turning on and off illuminator elements 15a to 15n along axis 29 provides for directional control of viewing windows. The head 45 position may be monitored with a sensor system comprising a camera, motion sensor, motion detector, or any other appropriate optical, mechanical or electrical means, arranged to detect the position of an observer relative to the display device. The control system controls the appropriate illuminator elements of illuminator array 15 to direct the displayed images into viewing windows in positions corresponding to the left and right eyes of the observer, in dependence on the detected position of the observer, thereby to provide substantially independent images to each eye irrespective of the head 45 position. The sensor system may be a head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all imaging optical valve systems or imaging directional backlights.

Figure 8:
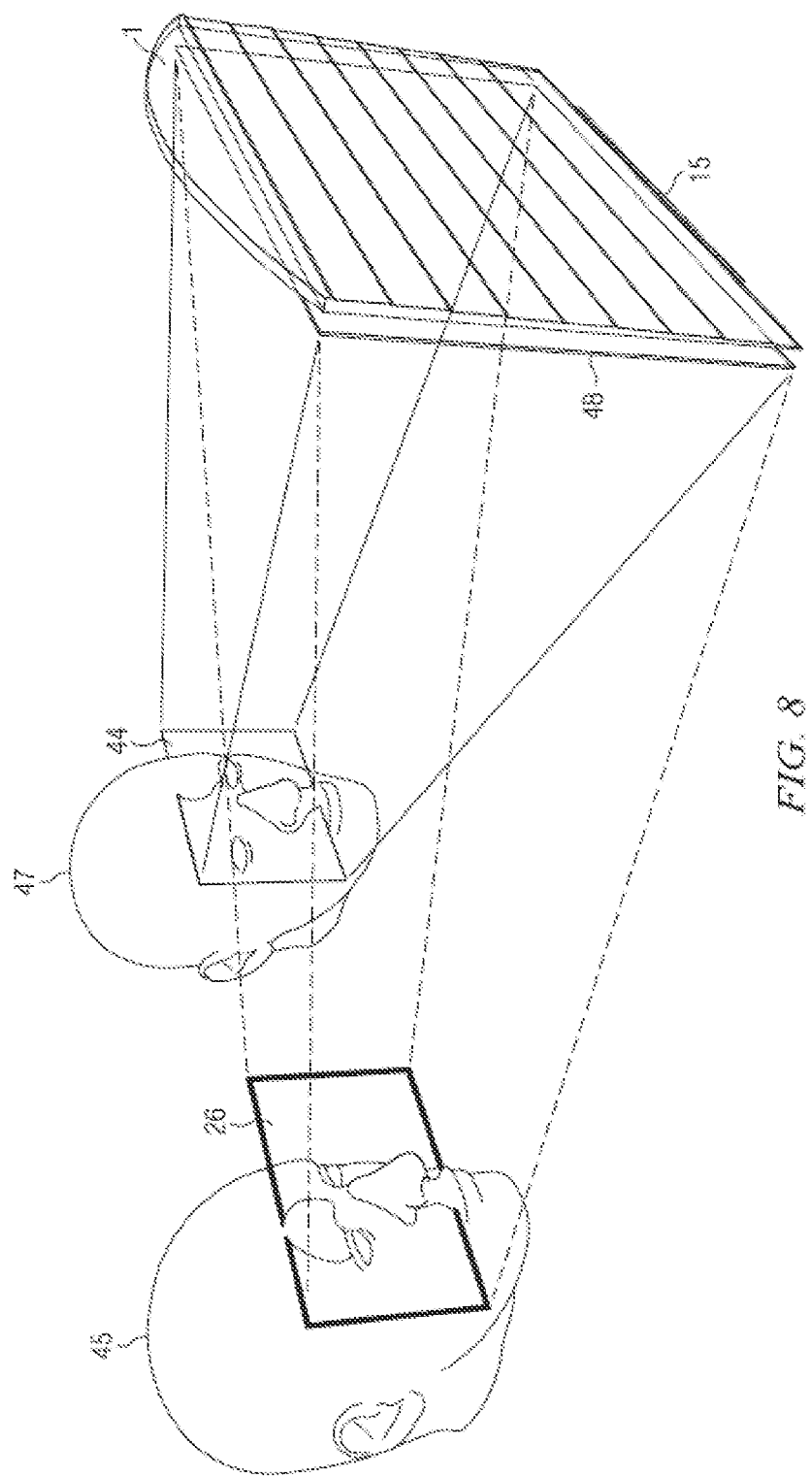
FIG. 8 is a schematic diagram illustrating a multi-viewer display apparatus including a time multiplexed optical valve apparatus, in accordance with the present disclosure.

FIG. 8 is a schematic diagram illustrating one embodiment of a multi-viewer display apparatus which includes a time multiplexed optical valve apparatus as an example of an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images may be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
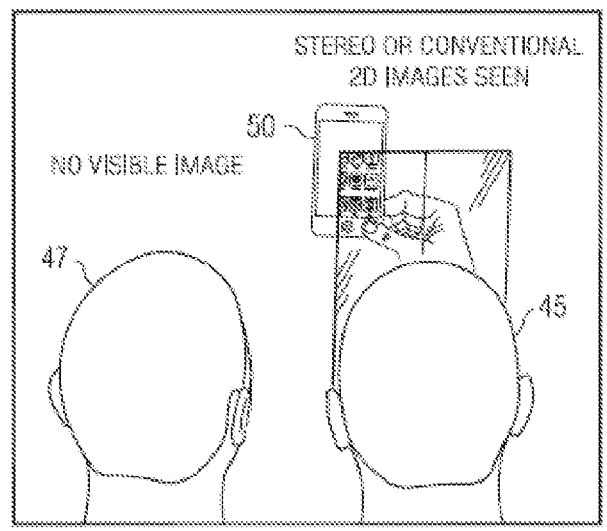
FIG. 9 is a schematic diagram illustrating a privacy display apparatus including an optical valve apparatus, in accordance with the present disclosure.

FIG. 9 is a schematic diagram illustrating a privacy display apparatus which includes an imaging directional backlight apparatus, and as illustrated, an optical valve. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
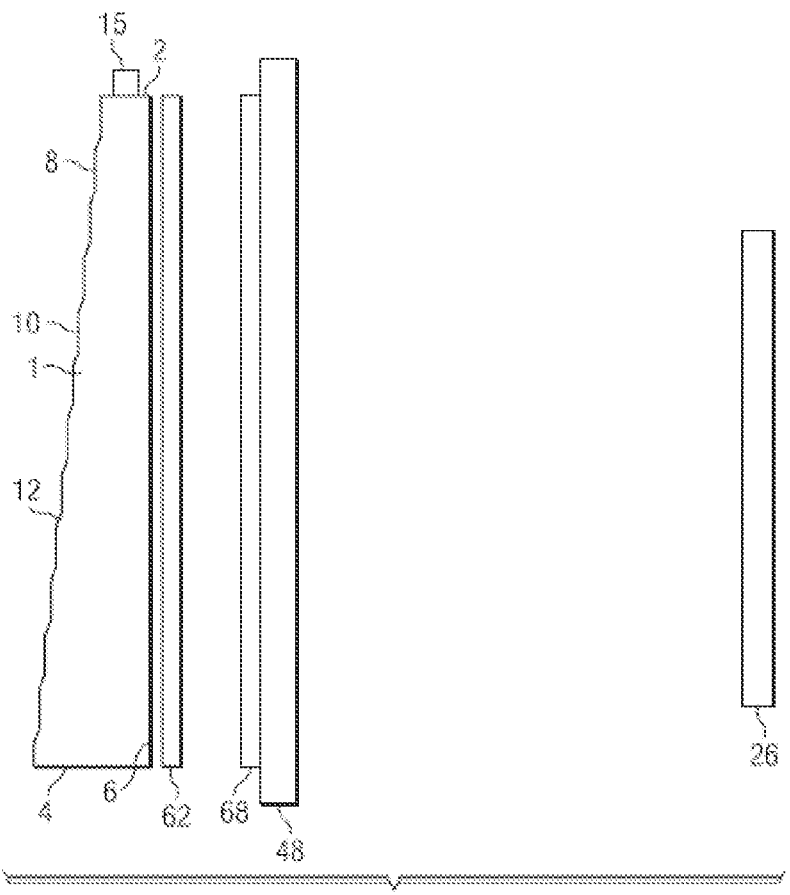
FIG. 10 is a schematic diagram illustrating in side view, the structure of a time multiplexed optical valve apparatus, in accordance with the present disclosure.

FIG. 10 is a schematic diagram illustrating in side view the structure of a time multiplexed optical valve apparatus as an example of an imaging directional backlight. Further, FIG. 10 shows in side view an autostereoscopic display, which may include the stepped waveguide 1 and a Fresnel lens 62 arranged to provide the viewing window 26 for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to advantageously provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Figure 11:
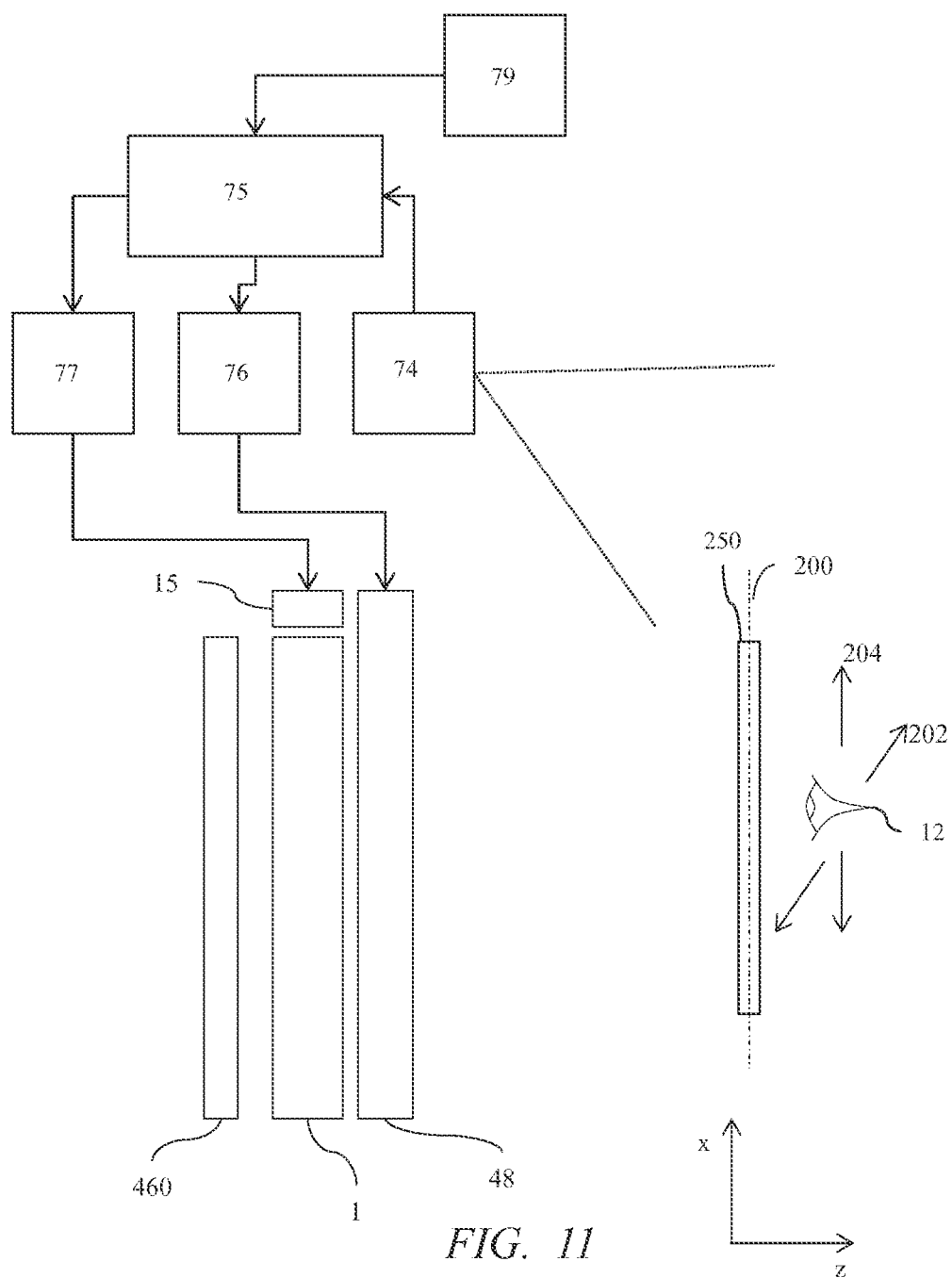
FIG. 11 is a schematic diagram illustrating a side view of an observer tracking autostereoscopic display capable of providing observer tracking in horizontal and vertical directions and comprising a directional backlight, a reflective element and transmissive spatial light modulator, in accordance with the present disclosure.

FIG. 11 is a schematic diagram illustrating an observer tracking time multiplexed autostereoscopic display for an observer 12 moving in horizontal direction 202 and vertical direction 204 with respect to a rear illuminated autostereoscopic display comprising a stepped waveguide 1 and reflective element 460 and a transmissive spatial light modulator such as an LCD 48. An orientation sensor 79 may be used to detect the orientation of the view of the observer and thus to determine landscape or portrait operation of the LCD 48 and an observer tracking system 74 including a sensor such as a camera in cooperation with a computer vision processing system is used to detect the position of an observer in two dimensions across the display device near a nominal viewing plane 200. Thus, the observer tracking system 74 and the orientation sensor 79 together form a sensor system that detects the position of an observer in two dimensions across the display device and the orientation of the view of the observer. Other types of sensor system could alternatively be provided to obtain this information. For example the observer tracking system 74 could determine both the position and orientation. In that case the orientation could be indicated directly or by indicating the position of both eyes of the viewer.

The display comprises a control system arranged as follows. A system control apparatus 75 is used to determine the image to be presented by means of an image controller 76; and the illumination from a light emitting element array 15 by means of an illumination controller 77. Such a display provides a viewing window array 250 at a nominal viewing plane 200. The control system and display apparatus can thus achieve the desired illumination and image data to the respective left and right eyes of the observer for movements in horizontal 202 and vertical 204 directions in both landscape and portrait modes of operation. Further such a display is capable of viewing in 2D and 3D modes in landscape and portrait operation. As will be disclosed, such landscape/portrait operation is achieved by means of viewing window array 250 that is inclined at nominally 45 degrees to horizontal and vertical axes of the LCD 48. Thus, the control system controls the display device to display temporally multiplexed left and right images and synchronously to direct the displayed images into viewing windows in positions corresponding to the left and right eyes of the observer, in dependence on the detected position of the observer and on the detected orientation of the view.

Figure 12:
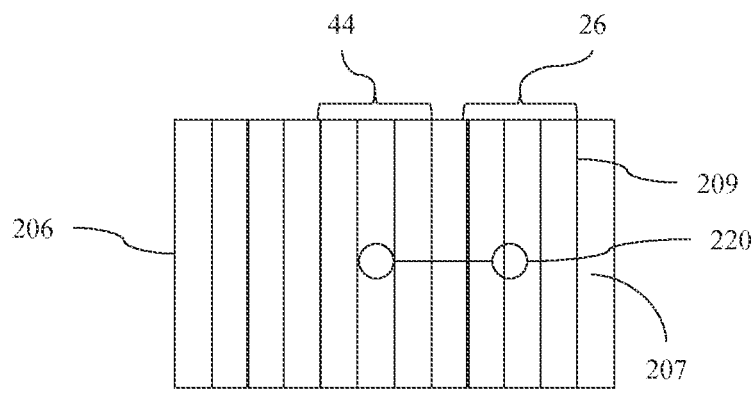
FIG. 12 is a schematic diagram illustrating a front view of an array of viewing windows of an autostereoscopic display during landscape operation, in accordance with the present disclosure.

FIG. 12 is a schematic diagram illustrating a front view of the array 206 of optical windows comprising a vertical optical window orientation for viewing the display in landscape mode. The array of pixels of the SLM 48 are arranged in an aperture that has a rectangular shape. The windows are arranged to comprise left and right eye image data. An observer with right eye position 220 will see an orthoscopic 3D image, formed by composite windows, which may comprise groups of sub-windows, 26, 44. Observer movement in the horizontal direction can be achieved by adjusting the position of composite window 26, 44 by means of controlling the switching time (phase) and intensity of the sub-windows of the array 206. An observer moving in the vertical direction can maintain an orthoscopic image without adjusting the position or image content of the composite windows.

Figure 13:
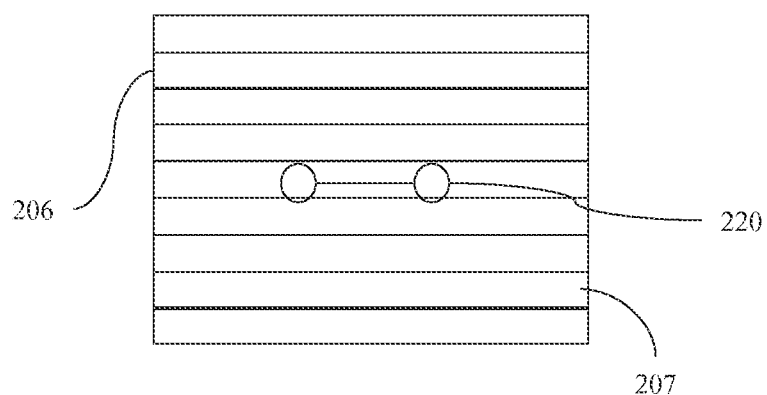
FIG. 13 is a schematic diagram illustrating a front view of an array of viewing windows of an autostereoscopic display during portrait operation, in accordance with the present disclosure.

FIG. 13 is a schematic diagram illustrating a front view of the array 206 of optical windows comprising a horizontal optical window orientation for viewing the display in portrait mode. Thus the window array 206 has rotated horizontally together with the display, for example in a mobile display used for landscape and portrait operations. Observer 220 has both eyes in the same horizontally extended window and no autostereoscopic image may be perceived, instead a single 2D view is seen.

It may be desirable to provide a display system that can be used in landscape and portrait modes for 3D operation, particularly for mobile display platforms and also rotatable desktop and advertising displays for example.

FIG. 14A is a schematic diagram illustrating a front view of an array of viewing windows from an autostereoscopic display that comprises two sets of independently switchable windows 238 and 242 controlled to provide landscape operation. Such a display may comprise for example a pair of autostereoscopic displays with the outputs combined by means of a beam combining semi-mirror as known in the art. Thus the observer 220 sees light from window array 238 and no light from window array 242. Such an observer can be tracked as described above. Similarly, FIG. 14B is a schematic diagram illustrating a front view of an array of viewing windows from an autostereoscopic display comprising two sets of independently switchable windows 238 and 242 controlled to provide portrait operation. Thus the observer 220 sees light from window array 242 and no light from window array 238. In this manner, two directional backlights can achieve two independently tracked window arrays 238, 242 for landscape and portrait operation. Disadvantageously such a system has increased cost, thickness and light losses compared to a single stepped waveguide arrangement.

FIG. 15A is a schematic diagram illustrating a front view of an array 246 of viewing windows from an autostereoscopic display apparatus comprising a two dimensional array of optical windows controlled to provide landscape operation for an observer 220 and FIG. 15B is a schematic diagram illustrating a front view of an array of viewing windows from an autostereoscopic display apparatus comprising a two dimensional array of optical windows controlled to provide portrait operation for an observer 220. Window array 246 may provide independently controlled windows for horizontal and vertical observer position movement in both landscape and portrait modes. Such a display may be provided by means for example of an integral imaging display comprising a microlens array in alignment with a spatial light modulator as known in the art. Disadvantageously such an arrangement has reduced resolution 3D images.

Figure 16A:
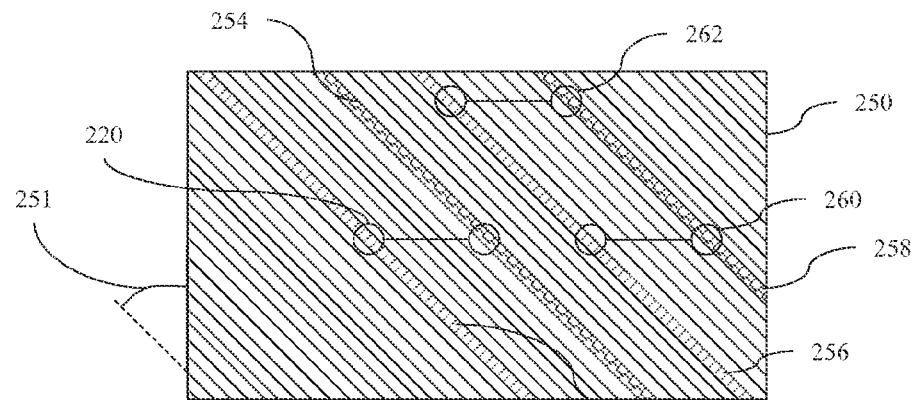
FIG. 16A is a schematic diagram illustrating a front view of an array of viewing windows for providing landscape and portrait operation from an autostereoscopic display apparatus when used in landscape mode, in accordance with the present disclosure.
Figure 16B:
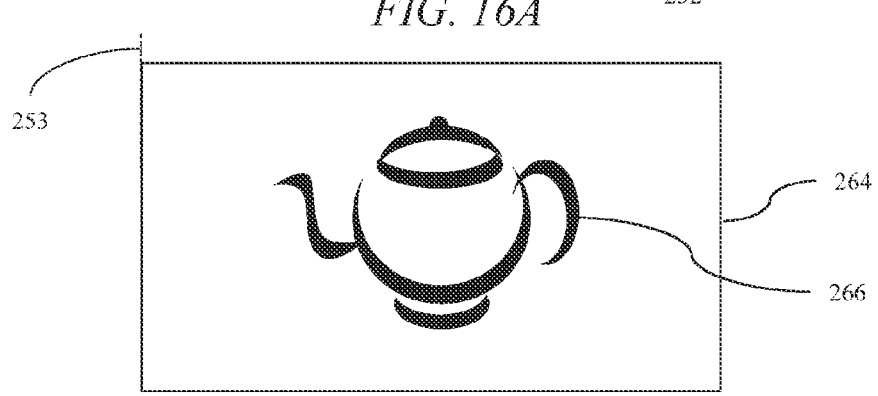
FIG. 16B is a schematic diagram illustrating a front view of an image from an autostereoscopic display apparatus in landscape mode, in accordance with the present disclosure.

There will now be described an autostereoscopic display apparatus in which the array of pixels of the SLM 48 are arranged in an aperture that has a rectangular shape, but is capable of providing landscape and portrait operation. FIG. 16A is a schematic diagram illustrating a front view of an array of optical windows 250 from the autostereoscopic display apparatus when used in landscape mode and FIG. 16B is a schematic diagram illustrating a front view of an image from the autostereoscopic display apparatus in landscape mode. Thus optical windows 250 are inclined at an angle 251 that is in a range around 45 degrees to an axis of mirror symmetry of the rectangular shape of the aperture, in this example the minor axis of mirror symmetry 253, although of course the angle to the major axis of mirror symmetry. The range may be from 25 to 65 degrees, preferably from 30 to 60 degrees, more preferably from 35 and 55 degrees and more preferably between 40 and 50 degrees and most preferably at 45 degrees. The line between the observer's eyes is thus substantially orthogonal to the panel axis for landscape viewing and parallel to the panel axis for portrait viewing. In landscape mode, observer sees image 266 on the panel 264 for one eye.

The angled viewing windows may be used by the control system to provide autostereoscopic display of images in varied orientations of the display device, by controlling the display in dependence on a detected position of the observer and on a detected orientation of the view. In particular, since the angled windows are separated along both axes of mirror symmetry, left and right images can be directed to be displayed images in viewing windows in positions corresponding to the left and right eyes of the observer, when the display apparatus is viewed in orientations in which either axis is at or around vertical, as follows.

FIGS. 16A and 16B illustrate the operation when the detected orientation is a landscape view, for example, the axis 253 or mirror symmetry is vertical. For an observer 220 at a known horizontal and vertical position with respect to the display, the sub-window 252 (and adjacent sub-windows) may comprise left eye image data and the sub-window 254 may comprise right eye image data. If the observer moves laterally to a position 260, then the sub-window 256 may be addressed with left eye data and the sub-window 258 may comprise right eye data. If the observer moves further vertically and horizontally in a 45 degrees direction to position 262 then the window data may remain unchanged even though there has been a component of lateral movement. Thus an observer tracking system must determine observer position in two directions and update the display accordingly. Further if the longitudinal position is known then the display can be updated in view slices to increase the viewing freedom.

Figure 17A:
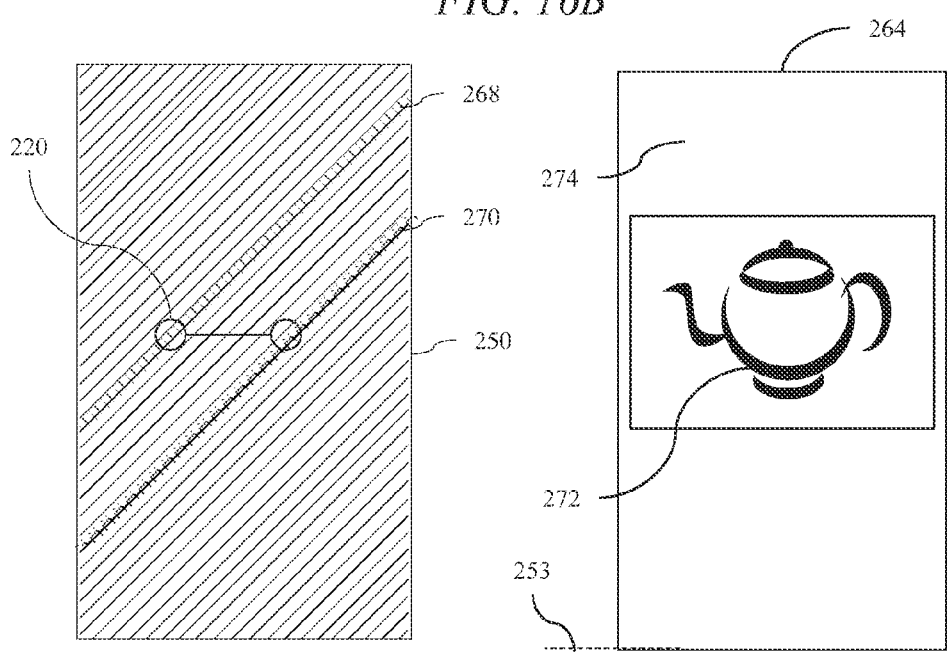
FIG. 17A is a schematic diagram illustrating a front view of an array of viewing windows for providing landscape and portrait operation from an autostereoscopic display apparatus when used in portrait mode, in accordance with the present disclosure.
Figure 17B:
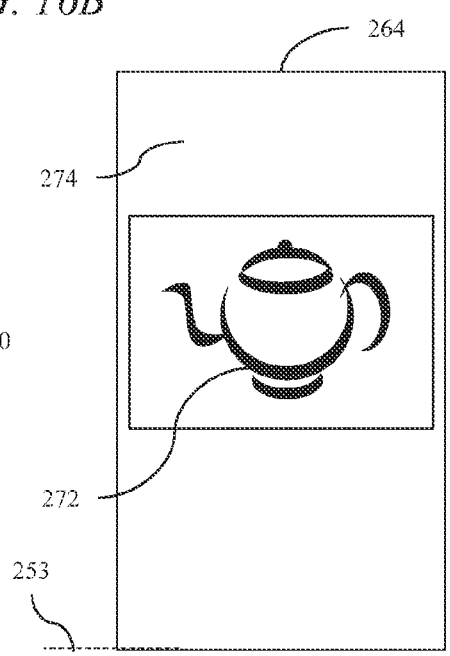
FIG. 17B is a schematic diagram illustrating a front view of an image from an autostereoscopic display apparatus in portrait mode, in accordance with the present disclosure.

FIGS. 17A and 17B illustrate the operation when the detected orientation is a portrait view, for example, the minor axis of mirror symmetry 253 is horizontal. FIG. 17A is a schematic diagram illustrating a front view of an array 250 of optical windows for providing landscape and portrait operation from an autostereoscopic display apparatus when used in portrait mode. FIG. 17B is a schematic diagram illustrating a front view of an image from an autostereoscopic display apparatus in portrait mode. In this embodiment, sub-window 268 may be addressed with left eye image data while sub-window 270 may be addressed with right eye image data. The portrait image may comprise stereo image data 272 and 2D image data 274 for example. In this manner, advantageously a single one dimensional, for example, extended in a 45 degree direction, set of windows from a single parallax optical system may be arranged to achieve landscape and portrait operation when used in cooperation with an observer tracking system. Such an arrangement can achieve increased efficiency and reduced cost compared to systems capable of achieving two dimensional window arrays.

Figure 18:
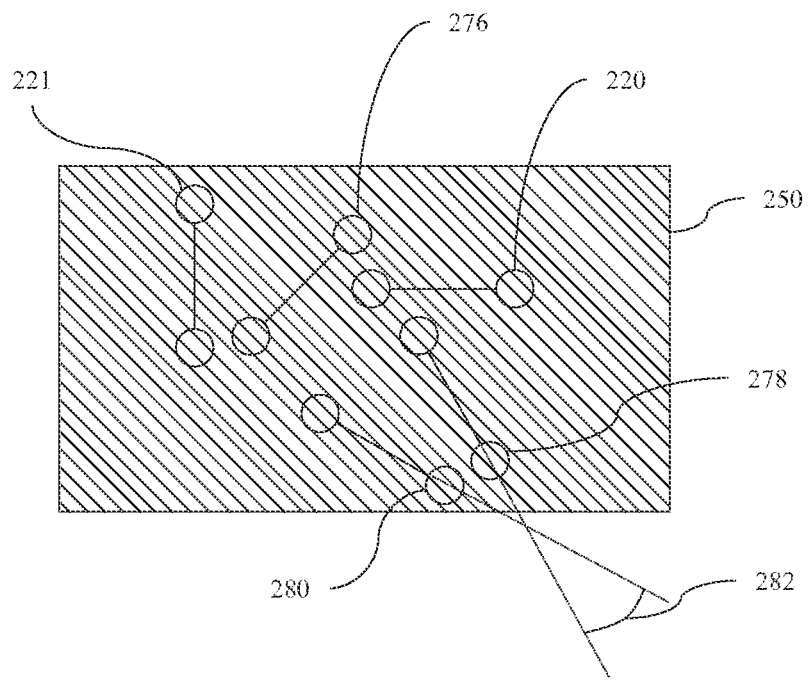
FIG. 18 is a schematic diagram illustrating a front view of an array of viewing windows for landscape and portrait operation schematically illustrating limits on panel rotation angle, in accordance with the present disclosure.

FIG. 18 is a schematic diagram illustrating a front view of an array of optical windows 250 for landscape and portrait operation schematically illustrating limits on panel rotation angle. Thus observer 220, 221, 276 can be presented with well controlled stereoscopic images. For observers in the angular range 282 and bounded by observer positions 278, 280 then little or no stereoscopic image will be seen. For these observer orientations, the control system may be arranged to address the panel with 2D data to avoid loss of fidelity from image cross talk.

Figure 19:
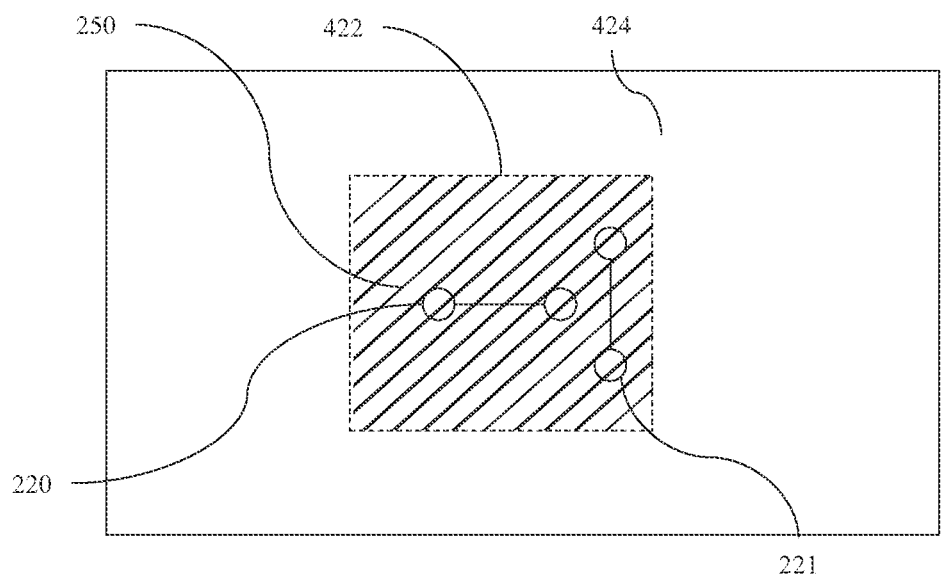
FIG. 19 is a schematic diagram further illustrating a front view of the processing of viewing windows by a directional diffuser element, in accordance with the present disclosure.

FIG. 19 is a schematic diagram illustrating a front view of an array of optical windows 250 for landscape and portrait operation. An additional off-axis diffusing element arranged between a directional backlight 1 and spatial light modulator 48 may for example comprise Lumisty™ from Sumitomo Chemical Co. Ltd., such that on-axis light is transmitted while off-axis light is diffused. In this manner, a central window region 422 may be provided for on-axis autostereoscopic viewing while an off-axis 2D region 424 may be provided for 2D viewing. Thus observers with positions 220, 221 may be achieved, providing on-axis landscape and portrait modes and off axis 2D modes. Advantageously, such an arrangement uses a single stepped waveguide imaging directional backlight, has low cost and small bezel.

Time multiplexed autostereoscopic displays advantageously achieve high resolution images in 2D and 3D modes. It may be desirable to reduce chromatic aberrations of window imaging and package thickness in a directional backlight for a time multiplexed display.

Figure 20A:
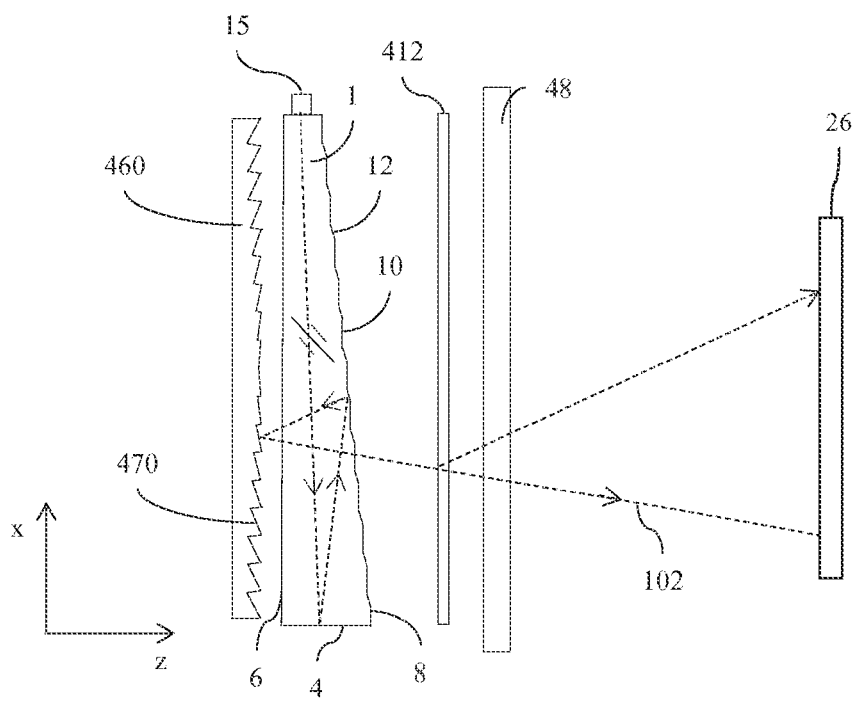
FIG. 20A is a schematic diagram illustrating a side view of an autostereoscopic apparatus comprising a stepped waveguide and a reflective Fresnel lens element, in accordance with the present disclosure.

FIG. 20A is a schematic diagram illustrating a side view of an autostereoscopic display comprising a reversed stepped waveguide 1 and a reflective optical element 460. The reflective element 460 is arranged to reflect the light exiting the first guide surface back through the waveguide 1. Thus, this reflected light then exits the waveguide 1 through the second guide surface. Thus, the waveguide 1 is used in the display device in an orientation that is reversed from that shown in U.S. patent application Ser. No. 13/300,293 so that the second guide surface faces forwards, rather than backwards. Therefore the SLM 48 extends across the second guide surface of the waveguide 1 for modulating the light exiting therethrough.

Figure 20B:
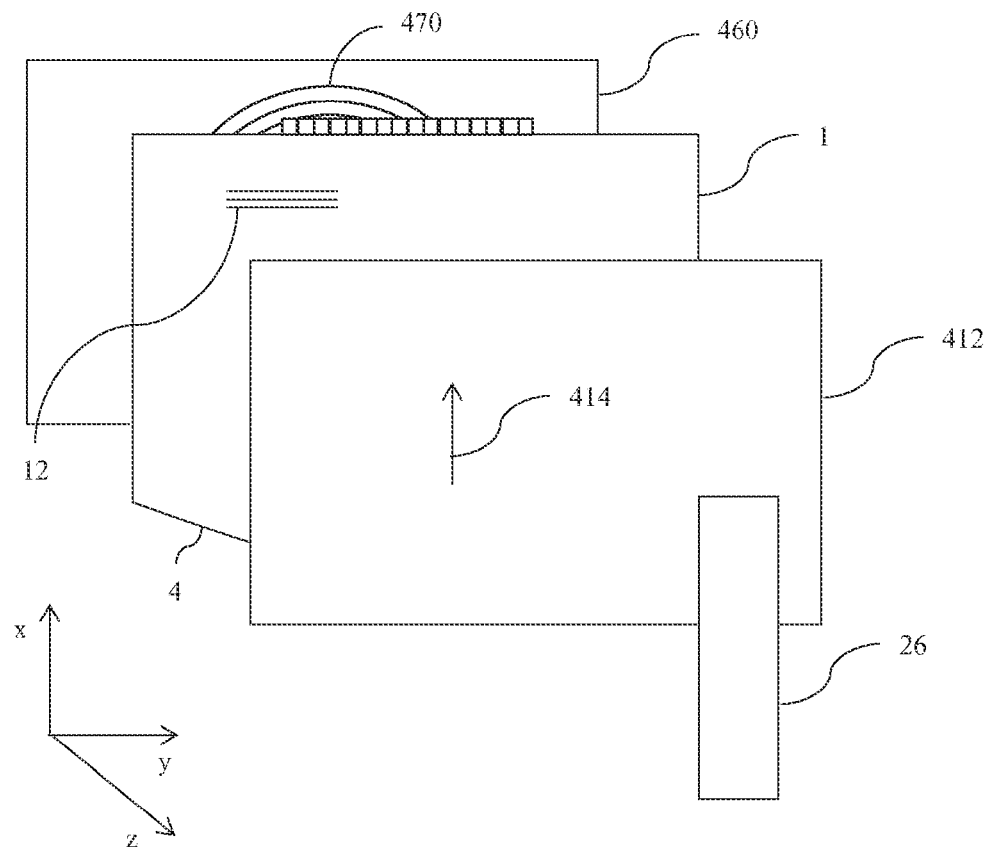
FIG. 20B is a schematic diagram illustrating a side view of the structure of the display of FIG. 20A, in accordance with the present disclosure.

FIG. 20B is a schematic diagram illustrating a front view of the same autostereoscopic display illumination stack comprising the stepped waveguide 1 and the reflective optical element 460; for convenience of illustration the LCD 48 is omitted. Light from array 15 is directed along stepped waveguide 1 and is incident on reflective end 4 from which it is reflected and guided on features 10 and side 6. On incidence with horizontal light extraction features 12 it is reflected backwards away from the observer whereon it is incident on a reflective optical element 460. In this example, the reflective element 460 is a converging Fresnel mirror. Thus, the front surface of the element 460 provides a Fresnel mirror surface 470 and provides a focusing function for incident light. Thus substantially collimated light ray 102 from the waveguide 1 is directed to vertical viewing window 26 at the window plane through the transparent side 6 and light guiding feature 10

(which operates as a transparent window in this mode) of the stepped waveguide 1. Diffuser 412 may comprise an asymmetric diffuser with major diffusion axis 414; orthogonal to this axis a small amount of diffusion may occur. For example axis 414 may achieve a 30 degree diffusion angle for collimated input light whereas orthogonal axis may achieve a 1 degree diffusion angle.

Thus the element 460 replaces the Fresnel lens 62 of the arrangement of FIG. 10 for example. Advantageously the reflective element 460 can be made on a thin substrate, for example formed into the case of the display to reduce thickness. Further, the reflective element 460 is achromatic, so window chromaticity may be reduced, thus increasing performance for off-axis illumination of viewing windows and reducing cross talk at wide viewing angles. Further, the separation of the pixels of the LCD 48 and the Fresnel surface 470 is increased, reducing Moiré and enabling a smaller gap between the waveguide 1 and asymmetric diffuser 412 with major diffusion direction 414, further reducing system thickness.

It may further be desirable to provide a time multiplexed autostereoscopic display apparatus that can achieve landscape and portrait modes of operation from single optical systems that provide a one dimensional array of viewing windows, thus reducing system complexity and cost.

Figure 21A:
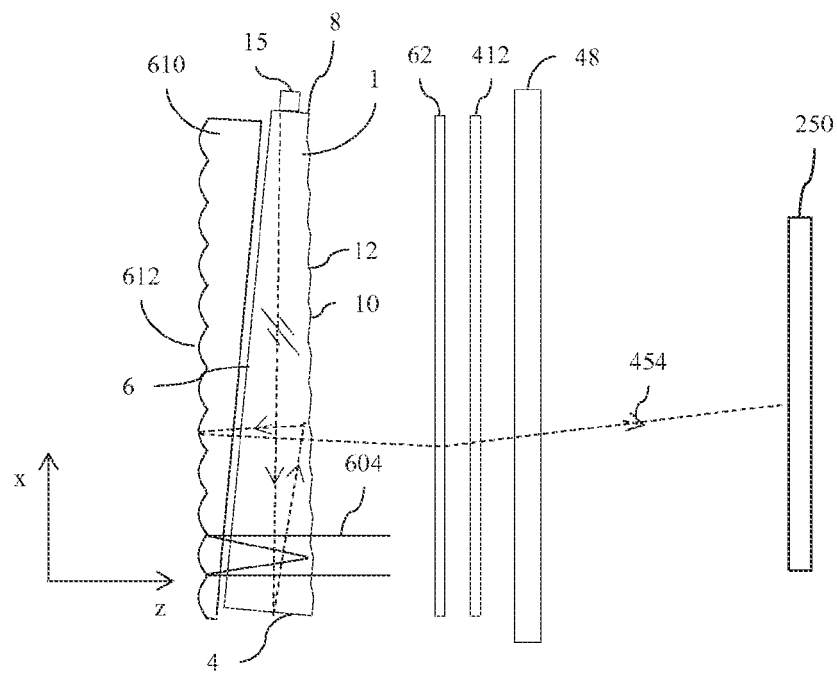
FIG. 21A is a schematic diagram illustrating a side view of an autostereoscopic display apparatus comprising a stepped imaging directional backlight and a collimating mirror array arranged to achieve landscape and portrait operation, in accordance with the present disclosure.
Figure 21B:
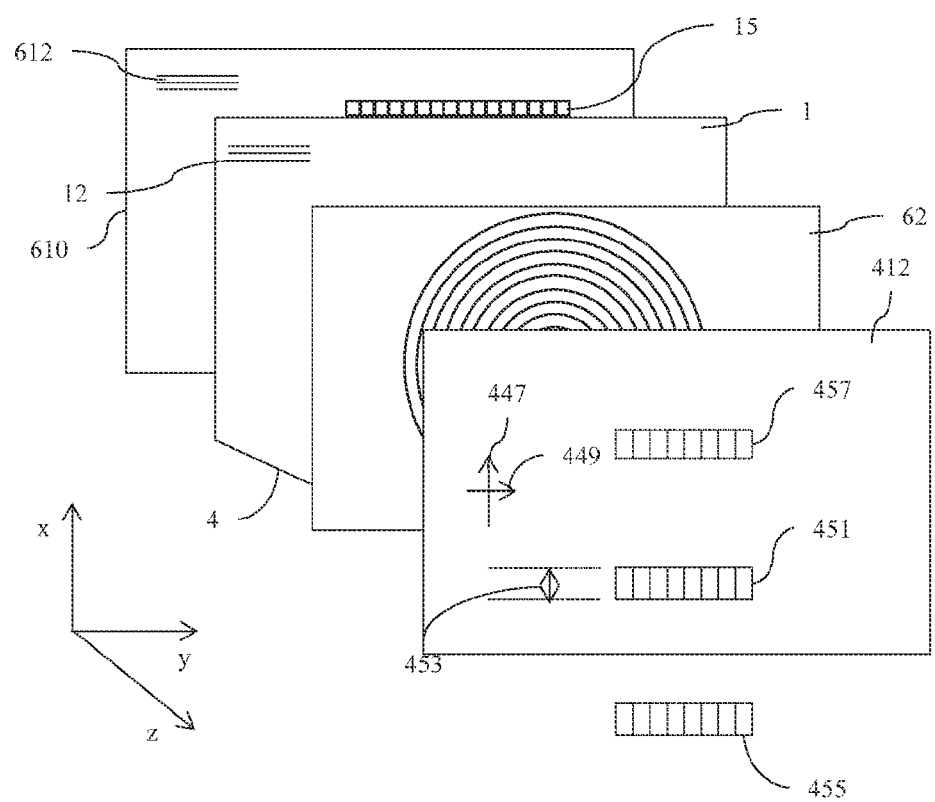
FIG. 21B is a schematic diagram illustrating a front view of a directional display apparatus comprising a stepped imaging directional backlight and a collimating mirror array arranged to achieve high brightness operation, in accordance with the present disclosure.

FIG. 21A is a schematic diagram illustrating a side view of an autostereoscopic display apparatus and FIG. 21B is a schematic diagram illustrating a front view of the same autostereoscopic display apparatus. The waveguide 1 is operated in reversed arrangement with the side 8 comprising features 10, 12 of the waveguide 1 arranged between the substantially planar guide surface 6 and SLM 48 so that light is output away from the SLM 48 in a first pass and directed onto a reflective element 610 comprising an array of concave mirrors 612 aligned with the features 12 of the waveguide 1. The reflective element 610 reflects the light back through the waveguide 1 to the SLM 48. The concave mirrors 612 each have a positive optical power in the x-z plane and are extended in the y direction in the case that the features 12 are linear in extent. The mirrors are therefore cylindrical mirrors, although the profile of the mirror surface in the first meridians may have a shape that is circular or non-circular so the word "cylindrical" in this context does not imply a mathematically strict restriction to a cylindrical shape as will be shown for example with reference to FIG. 21C.

The concave mirrors of the reflective element 610 are aligned with respective light extraction features 12 of the waveguide 1 and are arranged with a focus on the respective light extraction features 12.

The asymmetric diffuser 412 has major axis diffusion spread 447 and minor axis diffusion spread 449. Thus output viewing window arrays 451, 455, 457 comprise localized height optical windows in the x-direction when no diffuser is present. The height 453 is substantially determined by the size of the features 12 and the focal length of the concave mirrors 612 of the array 610. In this manner, the brightness of the output of the waveguide 1 is directed to a small range of vertical viewing angles with height 453 for each group of optical windows in the x-direction. Such a display can advantageously achieve very high brightness from array 15 of LEDs. Advantageously such a display can be used in bright outdoors lighting conditions with low power consumption. Observer tracking can be used to direct appropriate viewing windows to observer 12 to further reduce power consumption. Such a display may be used for an autostereoscopic display apparatus, for a very high brightness 2D display apparatus, or for a low power operation display system.

Figure 21C:
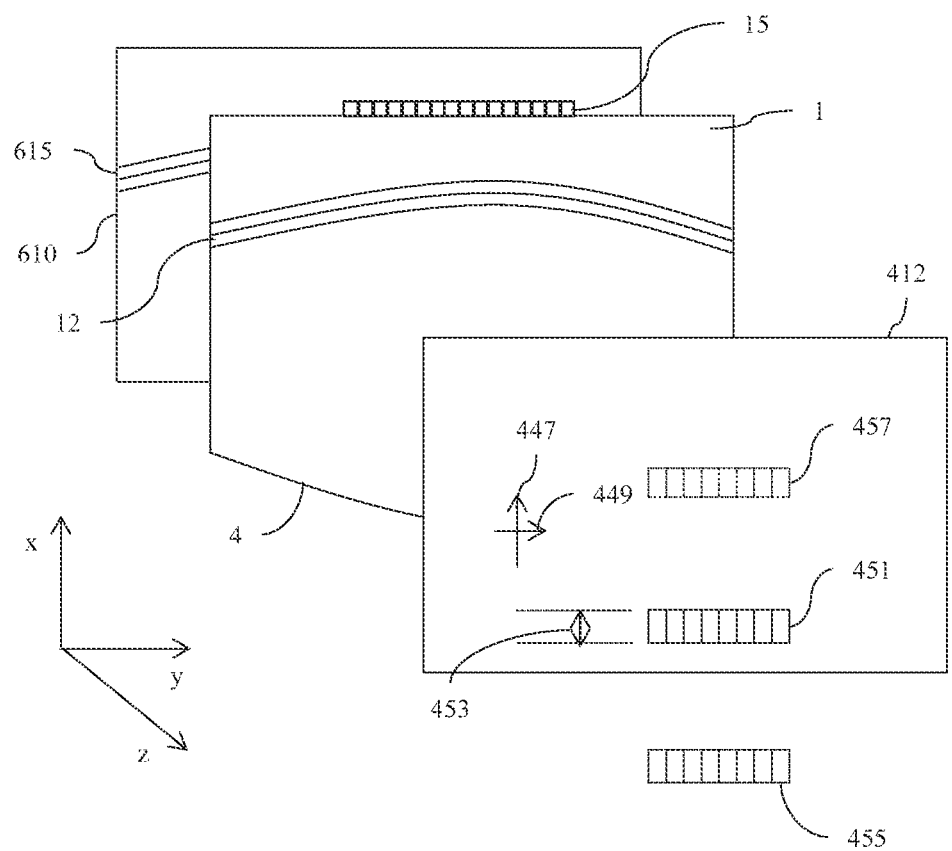
FIG. 21C is a schematic diagram illustrating a front view of a directional display apparatus comprising a stepped imaging directional backlight and a collimating mirror array comprising curved cylindrical mirrors arranged to achieve high brightness operation, in accordance with the present disclosure.

FIG. 21C is a schematic diagram illustrating a front view of a directional display apparatus comprising a stepped imaging directional backlight and a collimating mirror array comprising curved cylindrical mirrors arranged to achieve high brightness operation. The curved extraction features may be arranged to achieve imaging of the respective light sources of the array 15 to the viewing windows 451, 455, 457 without the lens 62. The mirrors 615 of the array 610 may be aligned with the extraction features 12 as described previously. Advantageously device thickness, light losses and complexity may be reduced in comparison to the arrangement of FIG. 21B.

Figure 22:
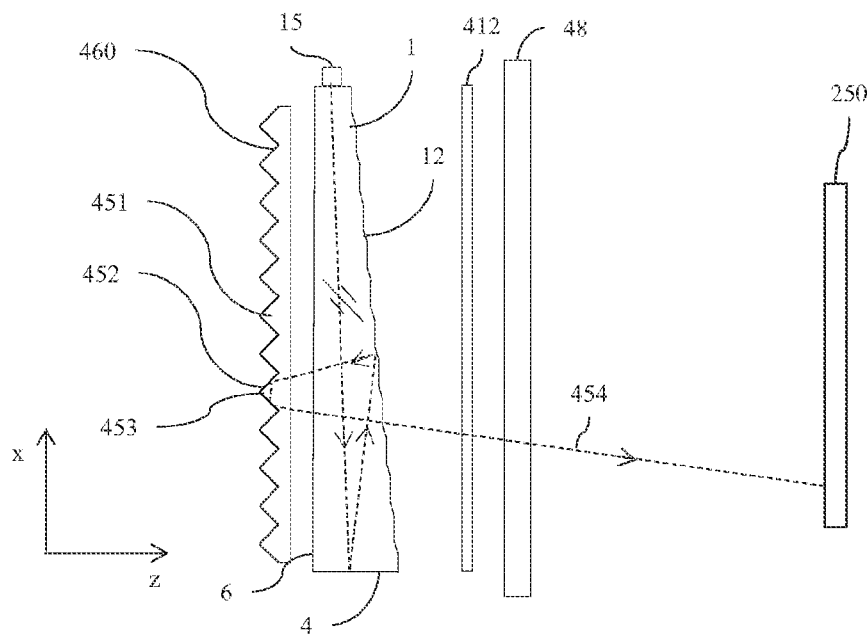
FIG. 22 is a schematic diagram illustrating a side view of an autostereoscopic display comprising a stepped imaging directional backlight arranged to achieve landscape and portrait operation and comprising a reflecting optical element, in accordance with the present disclosure.
Figure 23A:
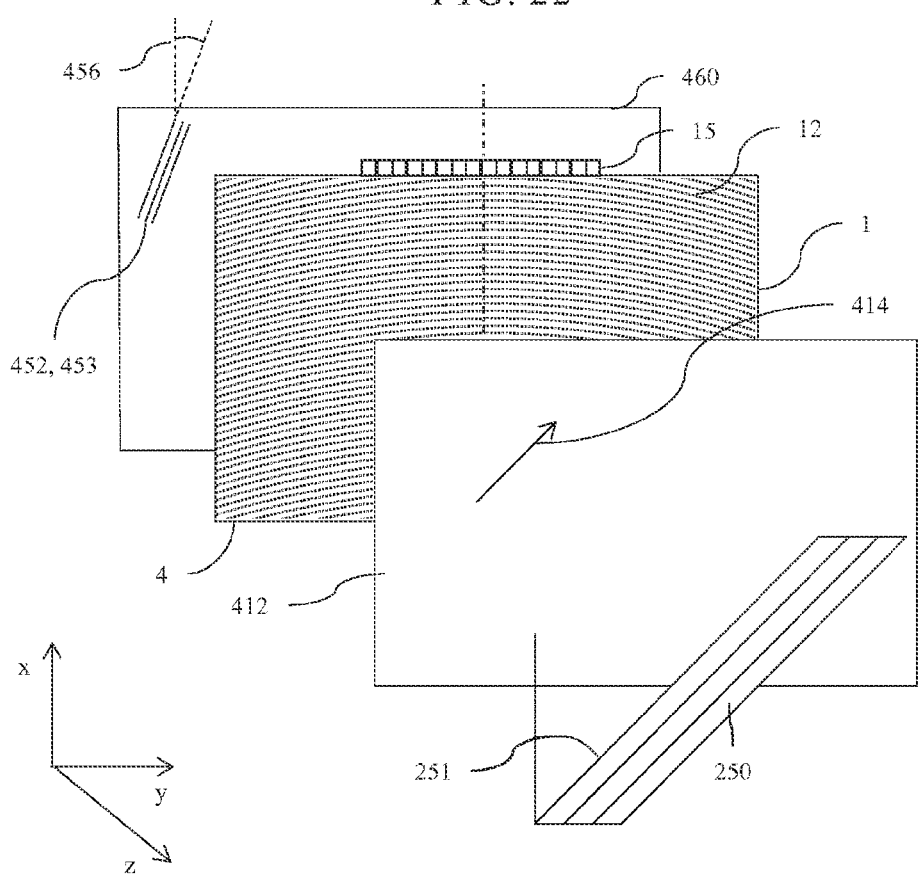
FIG. 23A is a schematic diagram illustrating a front view of the autostereoscopic display apparatus of FIG. 22 comprising a stepped imaging directional backlight with a first position of light emitting element array arranged to achieve landscape and portrait operation, in accordance with the present disclosure.

FIG. 22 is a schematic diagram illustrating a side view of an autostereoscopic display comprising a stepped imaging directional backlight comprising a reflective element arranged to achieve landscape and portrait operation. FIG. 23A is a schematic diagram illustrating a front view of the autostereoscopic display apparatus of FIG. 22 comprising a stepped imaging directional backlight arranged to achieve landscape and portrait operation. Known embodiments not comprising element 460 comprise for example Fresnel lens 62 that is transmissive and thus may have limited optical power, light losses from Fresnel reflections and may provide a chromatic distribution of window offsets due to material dispersion.

Stepped waveguide 1 is oriented with features 12 arranged between the planar side 6 and LCD 48. Thus light rays 454 from features 12 are directed away from the panel and are incident on a reflective optical element 460 arranged to reflect the light exiting the first guide surface back through the waveguide 1. Thus, this reflected light then exits the waveguide 1 through the second guide surface. Thus, the waveguide 1 is used in the display device in an orientation that is reversed from that shown in U.S. patent application Ser. No. 13/300,293 so that the second guide surface faces forwards, rather than backwards. Therefore the SLM 48 extends across the second guide surface of the waveguide 1 for modulating the light exiting therethrough.

In this case, the light extraction features 12 are inclined relative to the optical axis of the waveguide in a plane containing the optical axis and the normal to the SLM 48. Herein, the reference to the light extraction features 12 (or other features) being inclined "in a plane" has its normal meaning that the light extraction features 12 (or other features) are inclined as viewed in that plane, notionally as though the inclination is achieved by a rotating the light extraction features 12 (or other features) from a non-inclined state around a normal to that plane.

As a result of this inclination, the light extraction features 12 do not rotate the optical around the normal to the SLM 48. Thus an additional optical element is needed to provide that rotation, in particular in this example the reflective element 460 that is arranged as follows.

The reflective element 460 is a prism array comprising linear array of pairs of reflective corner facets 452, 453. The reflective corner facets 452, 453 of each pair are inclined relative to the normal to the SLM 48 in opposite senses in a plane containing the normal to the SLM 48 and at a non-zero angle to the optical axis of the waveguide 1 and at a non-zero angle to the perpendicular to the optical axis of the waveguide 1. Thus the corner facets 452, 453 as viewed along the normal to the SLM 48 extend at a non-zero angle to the optical axis of the waveguide, typically with an orientation of 22.5 degrees with respect to the optical axis to achieve a 45 degree rotation of the optical windows. The angle of inclination of the corner facets 452, 453 in that plane is selected to reverse the light on the double reflection, typically using an angle of inclination of 45 degrees.

Optical windows 250 are rotated around the normal to the SLM 48 by the double reflection at corner facets 452, 453, due to them extending at a non-zero angle to the optical axis of the waveguide 1. Due to the double reflection, the rotation is achieved without any deflection away from the normal to the SLM 48. The reflected light is then transmitted through the waveguide 1 to diffuser 412 with axis direction 414. The extraction features 12 may comprise curved elements and a Fresnel mirror may be arranged on reflective end 4 to provide collimation of light within the stepped waveguide 1.

The element 460 may be formed for example by replication and may be metallized or may operate by total internal reflection. As shown in FIG. 22 the element 460 may be arranged as an internal prismatic reflector in which the reflecting facets 452, 453 are arranged in transparent material 451 with a planar input side. Advantageously, the acceptance angle of the prismatic structure is increased and the reflections at facets 452, 453 may be provided at least in part by total internal reflection. Alternatively, the facets may be arranged in air to receive light from waveguide 1. Advantageously the surface finish of the plane side of material 451 does not need to be controlled.

Advantageously the present embodiment achieves window arrays with a 45 degree orientation from a single reflective layer and so chromatic aberration effects are reduced. A thin package with small bezel size may be achieved at low cost.

Figure 23B:
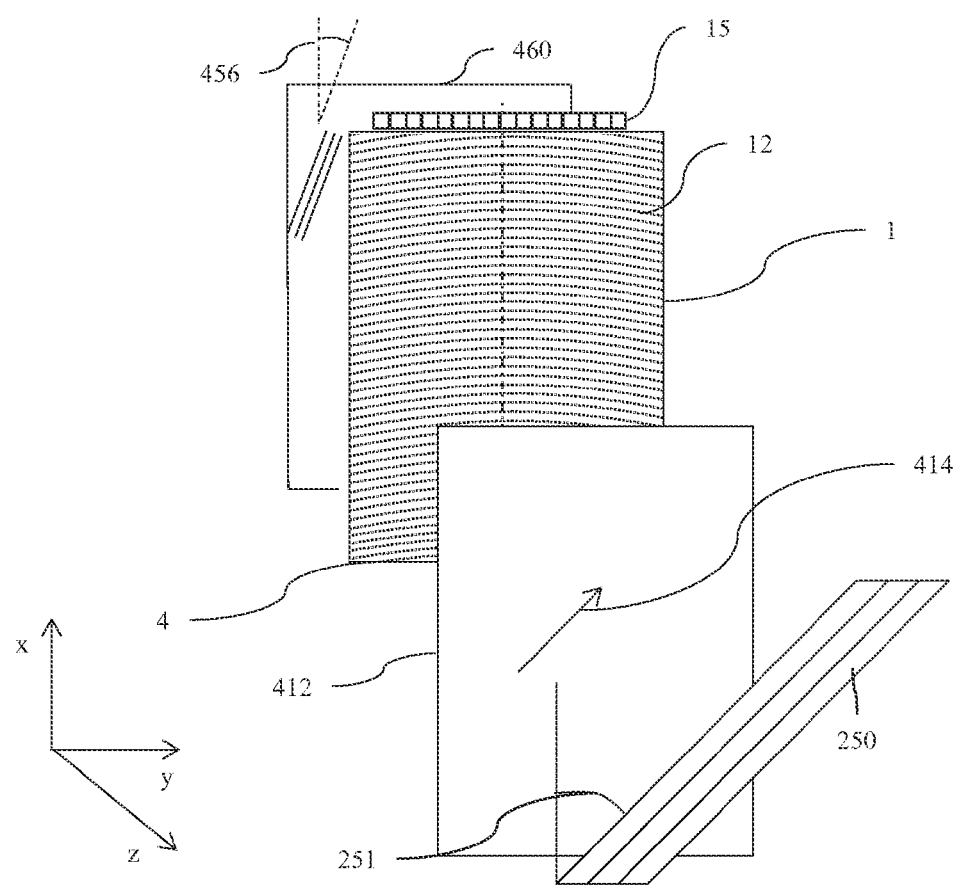
FIG. 23B is a schematic diagram illustrating a front view of the autostereoscopic display apparatus of FIG. 22 with a second position of light emitting element array, in accordance with the present disclosure.

FIG. 23B is a schematic diagram illustrating a front view of an autostereoscopic display apparatus of FIG. 22 comprising a stepped imaging directional backlight arranged to achieve landscape and portrait operation and shown with a light emitting element array 15 on the short side of the waveguide 1. In this display, the optical axis of the waveguide 1 extends parallel to the major axis of the shape of the aperture. By way of comparison with FIG. 23A, the present embodiment advantageously achieves a narrow bezel width to either side of the long edges of the waveguide 1. Such an arrangement can more conveniently be arranged inside the package of mobile display platforms without increasing their width. Further, the separation of the end 4 comprising an optically powered reflector from the array 15 is increased. Advantageously the magnification of the system is reduced compared to the embodiment of FIG. 26A, thus employing larger pitch LEDs of the array 15 for a given viewing distance to achieve flicker free observer tracking. Larger pitch LEDs may advantageously be cheaper to make and more convenient to package. Further, the numerical aperture of the optical system can be reduced, thus improving aberrations of the imaging system, thus increasing viewing freedom.

Figure 24:
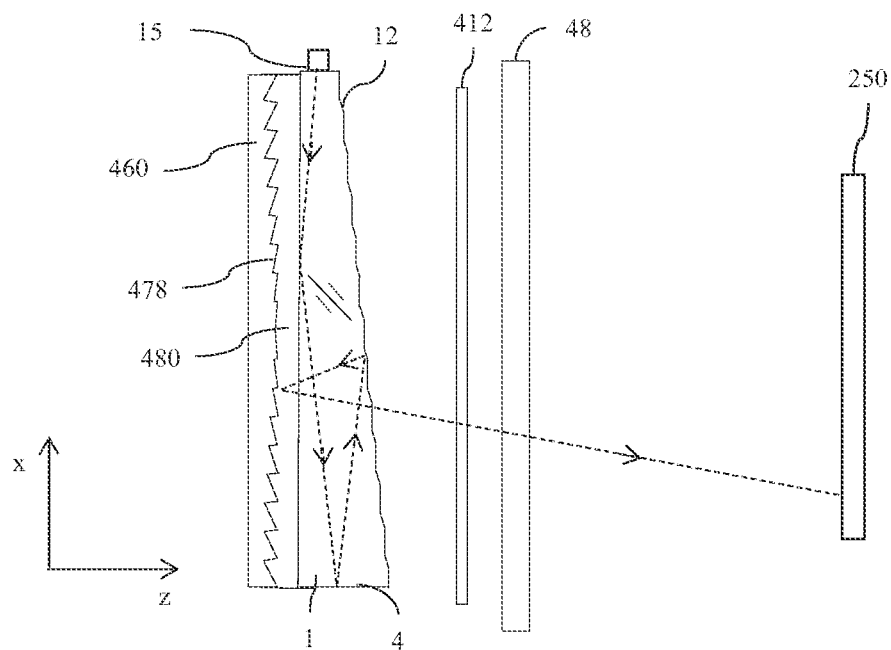
FIG. 24 is a schematic diagram illustrating a side view of an autostereoscopic display comprising a stepped imaging directional backlight and reflective optical element, in accordance with the present disclosure.

FIG. 24 is a schematic diagram illustrating a side view of an autostereoscopic display comprising a stepped imaging directional backlight and reflective optical element. In this embodiment a low refractive index material 480 such as a fluorinated material or silicone material with refractive index 1.42 or lower may be inserted between the reflective element 460 and side 6 of the waveguide, so as to enable guiding within a desired cone angle within the waveguide (for example formed from a polymer material with typical refractive index 1.49~1.56) while advantageously reducing thickness and light losses in the output path of the system. The side 478 may be made reflective through metallization for example.

Figure 25:
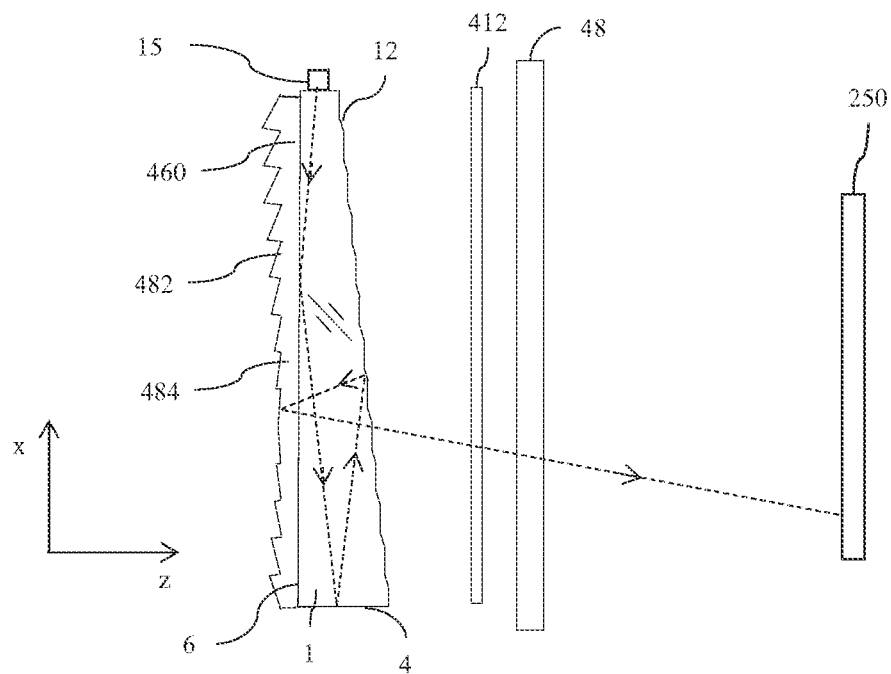
FIG. 25 is a schematic diagram illustrating a side view of an autostereoscopic display comprising a stepped imaging directional backlight and reflective optical element, in accordance with the present disclosure.

FIG. 25 is a schematic diagram illustrating a side view of an autostereoscopic display comprising a stepped imaging directional backlight and reflective optical element. In this embodiment a low refractive index material 484 is used to form the reflective element 460 with an external reflective coating applied and formed on side 6 of the waveguide, so as to enable guiding within a desired cone angle within the waveguide while advantageously reducing thickness and light losses in the output path of the system. Advantageously, this can achieve further reduction in number of processing steps and reduced device cost.

Figure 26:
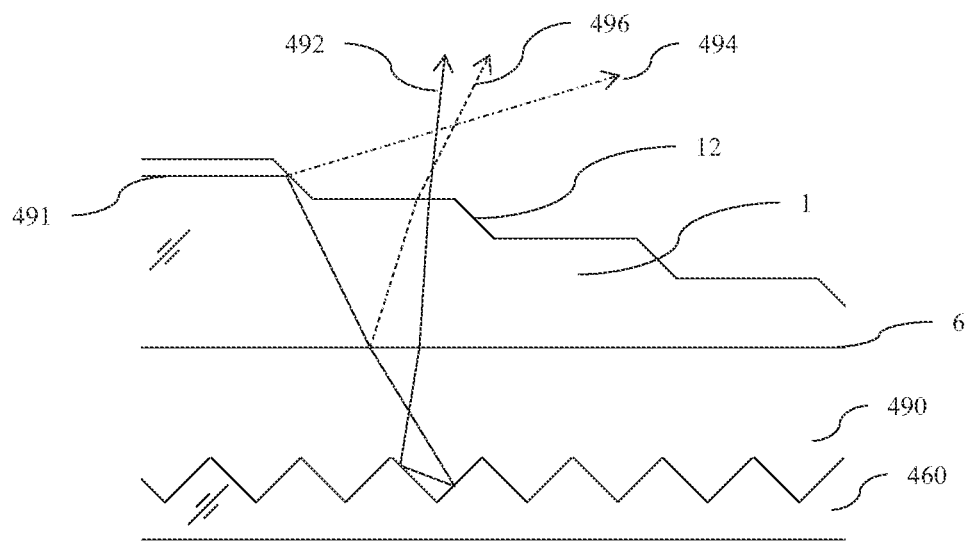
FIG. 26 is a schematic diagram illustrating a side view of part of the autostereoscopic display apparatus of FIG. 25, in accordance with the present disclosure.

FIG. 26 is a schematic diagram illustrating a front view of the autostereoscopic display apparatus of FIG. 22. Input light ray 491 is incident on a light extraction feature 12 and is directed towards the side 6 of the waveguide 1. Light rays 492 pass through air gap 490 whereon they are reflected at the prismatic side of structure 460 and are transmitted through the waveguide 1 towards the observer plane to achieve tilted window array 250 at the window plane. Light rays 496 however are reflected at side 6 at the air interface of the waveguide and are redirected towards the window plane without any rotation. Thus stray windows of low intensity can be created which are not inclined at 45 degrees to the panel orientation. Rays 496 are thus unwanted light. Advantageously side 6 may be provided with an anti-reflection coating to reduce this effect.

Figure 27:
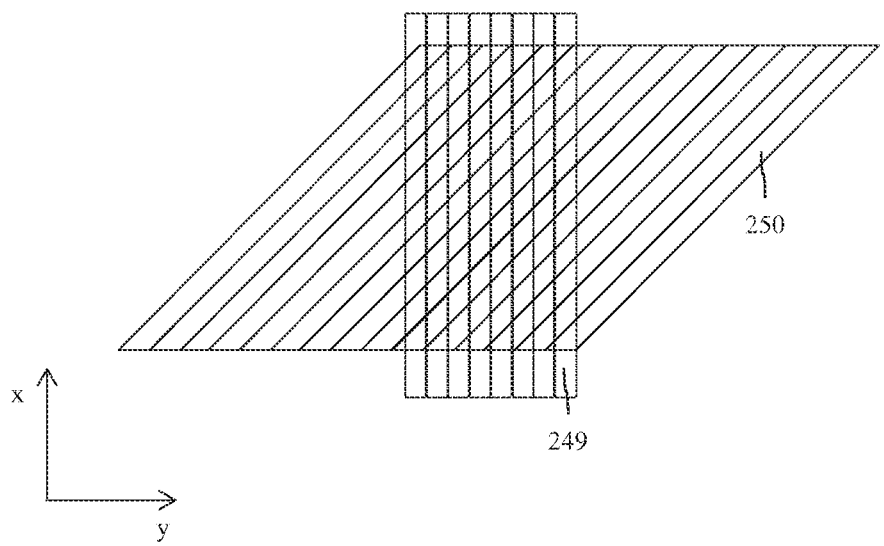
FIG. 27 is a schematic diagram illustrating a front view of an array of viewing windows in landscape mode, in accordance with the present disclosure.

FIG. 27 is a schematic diagram illustrating a front view of an array of viewing windows arising from the stray light reflection at side 6 as shown in FIG. 36, for example in landscape mode of operation. In this manner window array 249 overlays window array 250, creating regions of increased cross talk when left eye data is imaged in the desired location for right eye data. The observer's horizontal and vertical position can be measured with respect to this window array.

It may be desirable to reduce or remove the visibility of unwanted light that creates viewing window array 249. Further unwanted light from an observer may be transmitted through the LCD 48 and may be reflected at the structure 460, in a manner that creates an increased reflectivity from the display. Thus anti-reflection coating of side 6 will reduce the visibility of viewing windows 249.

The display apparatuses described above employ an SLM 48 having pixels arranged in an aperture having a rectangular shape. However, this shape is merely an example and in general the shape could be any shape having to any shape having two perpendicular axes of mirror symmetry, including without limitation rectangles with rounded corners or circles or ellipses. For example, a circular or ellipsoid shape might be used in a display for a watch. Similar considerations for viewing in different orientations apply to any such shape.

As may be used herein, the terms "substantially" and "approximately" provide an industry-accepted tolerance for its corresponding term and/or relativity between items. Such an industry-accepted tolerance ranges from zero to ten percent and corresponds to, but is not limited to, component values, angles, et cetera. Such relativity between items ranges between less than approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display apparatus comprising:
   a light directing device comprising:
   a waveguide extending between an input end for receiving input light and a reflective end for reflecting the input light back through the waveguide, the waveguide having first and second, opposed guide surfaces for guiding light forwards and back along the waveguide, wherein the second guide surface has a plurality of light extraction features facing the reflective end and inclined to reflect the light guided back through the waveguide from the reflective end in directions allowing exit through the first guide surface, the light extraction features being arranged to direct input light from different input positions across the input end in directions that are dependent on said input position; and
   a reflective element arranged to reflect the light exiting the first guide surface back through the waveguide to exit through the second guide surface;
   an array of light sources at different positions across the input end of the waveguide;
   a control system arranged to selectively operate the light sources so that the light extraction features direct the input light from a selectively operated light source into a corresponding one of a plurality of viewing windows having different positions; and
   a transmissive spatial light modulator extending across the second guide surface of the waveguide for modulating the light exiting therethrough.

2. A display apparatus according to claim 1, being an autostereoscopic display apparatus, wherein the control system is arranged to control the spatial light modulator to display temporally multiplexed left and right eye images and synchronously to operate the light sources to direct light into viewing windows in positions corresponding to the left and right eyes of an observer.

3. A display apparatus according to claim 2, further comprising a sensor system arranged to detect the position of an observer relative to the display device, the control system to direct the displayed images into viewing windows in positions corresponding to the left and right eyes of the observer, in dependence on the detected position of the observer.

4. A display apparatus according to claim 1, wherein the reflective element comprises a converging Fresnel mirror.

5. A display apparatus according to claim 1, wherein the reflective element comprises a concave mirror array.

6. A display apparatus according to claim 1, wherein the concave mirror array is aligned with the extraction features.

7. A display apparatus according to claim 3, wherein
   the spatial light modulator comprises an array of pixels arranged in an aperture with a shape having two perpendicular axes of mirror symmetry,
   the viewing windows extend at an angle in a range from 25 to 65 degrees relative to one of said axes of the shape of the aperture,
   the sensor system is further arranged to detect the orientation of the view of the observer, and
   the control system is arranged to direct the displayed images into the viewing windows in positions corresponding to the left and right eyes of the observer, in dependence on the detected orientation of the view, as well as the detected position of the observer.

8. A display apparatus according to claim 7, wherein said range is from 30 to 60 degrees, from 35 to 55 degrees, or from 40 to 50 degrees.

9. A display apparatus according to claim 7, wherein the sensor system comprises an observer tracking system arranged to detect the position of an observer in two dimensions across the display device and an orientation sensor arranged to detect the orientation of the view of the observer.

10. An autostereoscopic display apparatus, comprising:
    a display apparatus comprising:
    a light directing device comprising:
    a waveguide extending between an input end for receiving input light and a reflective end for reflecting the input light back through the waveguide, the waveguide having first and second, opposed guide surfaces for guiding light forwards and back along the waveguide, wherein the second guide surface has a plurality of light extraction features facing the reflective end and inclined to reflect the light guided back through the waveguide from the reflective end in directions allowing exit through the first guide surface, the light extraction features being arranged to direct input light from different input positions across the input end in directions that are dependent on said input position; and
    a reflective element arranged to reflect the light exiting the first guide surface back through the waveguide to exit through the second guide surface; and
    an array of light sources at different positions across the input end of the waveguide; and
    a control system arranged to selectively operate the light sources to direct light into a selectable one of a plurality of viewing windows having different positions;
    a transmissive spatial light modulator extending across the second guide surface of the waveguide for modulating the light exiting therethrough, wherein the spatial light modulator comprises an array of pixels arranged in an aperture with a shape having two perpendicular axes of mirror symmetry, the viewing windows extending at an angle in a range from 25 to 65 degrees relative to one of said axes of the shape of the aperture;
    a sensor system arranged to detect the position of an observer relative to the display device and to detect the orientation of the view of the observer, wherein the control system is arranged to control the spatial light modulator to display temporally multiplexed left and right eye images and synchronously to operate the light sources so that the light extraction features direct the input light from the operated light sources into corresponding viewing windows in positions corresponding to the left and right eyes of an observer, in dependence on the detected position of the observer and in dependence on the detected orientation of the view;
    further wherein the waveguide is oriented with respect to the spatial light modulator with the optical axis of the waveguide extending parallel or perpendicular to said axis of the shape of the aperture, and said reflective element is arranged to rotate the viewing windows around the normal to the spatial light modulator.

11. An autostereoscopic display apparatus according to claim 10, wherein said shape of the aperture is rectangular and the waveguide is oriented with respect to the spatial light modulator with the optical axis of the waveguide extending parallel to the major axis of the rectangular shape of the aperture.

12. An autostereoscopic display apparatus according to claim 10, wherein said reflective element is a linear array of pairs of reflective corner facets, the reflective corner facets of each pair being inclined relative to the normal to the spatial light modulator in opposite senses in a plane containing the normal to the spatial light modulator and at a non-zero angle to the optical axis of the waveguide.

13. An autostereoscopic display apparatus according to claim 10, wherein said shape of the aperture is rectangular.

14. A display apparatus according to claim 1, wherein the first guide surface is substantially planar.

15. A display apparatus according to claim 1, wherein the regions of the second guide surface between the light extraction features are substantially planar.

16. A display apparatus according to claim 1, further comprising a sensor system arranged to detect the position of an observer relative to the display device, the control system being arranged to direct the displayed images into viewing windows in positions in dependence on the detected position of the observer.

17. A display apparatus according to claim 16, wherein
the spatial light modulator comprises an array of pixels arranged in an aperture with a shape having two perpendicular axes of mirror symmetry,
the viewing windows extend at an angle in a range from 25 to 65 degrees relative to one of said axes of the shape of the aperture,
the sensor system is further arranged to detect the orientation of the view of the observer, and
the control system is arranged to direct the displayed images into the viewing windows in positions in dependence on the detected orientation of the view, as well as the detected position of the observer.

18. A display apparatus according to claim 17, wherein said shape of the aperture is rectangular and the waveguide is oriented with respect to the spatial light modulator with the optical axis of the waveguide extending parallel to the major axis of the rectangular shape of the aperture.

19. A display apparatus according to claim 17, wherein said range is from 30 to 60 degrees, from 35 to 55 degrees, or from 40 to 50 degrees.

20. A display apparatus according to claim 17, wherein
the waveguide is oriented with respect to the spatial light modulator with the optical axis of the waveguide extending parallel or perpendicular to said axis of the shape of the aperture, and
said reflective element is arranged to rotate the viewing windows around the normal to the spatial light modulator.

21. A display apparatus according to claim 20, wherein said reflective element is a linear array of pairs of reflective corner facets, the reflective corner facets of each pair being inclined relative to the normal to the spatial light modulator in opposite senses in a plane containing the normal to the spatial light modulator and at a non-zero angle to the optical axis of the waveguide.

22. A display apparatus according to claim 1, wherein said reflective element is arranged to rotate the viewing windows around the normal to the spatial light modulator.

23. A display apparatus according to claim 22, wherein said reflective element is a linear array of pairs of reflective corner facets, the reflective corner facets of each pair being inclined relative to the normal to the spatial light modulator in opposite senses in a plane containing the normal to the spatial light modulator and at a non-zero angle to the optical axis of the waveguide.

* * * * *